US007777673B2

(12) United States Patent
Mizuochi et al.

(10) Patent No.: US 7,777,673 B2
(45) Date of Patent: Aug. 17, 2010

(54) POSITIONING METHOD, POSITIONING DEVICE, AND PROGRAM

(75) Inventors: Shunichi Mizuochi, Nagano (JP); Yoshiyuki Muraguchi, Nagano (JP); Koichiro Yano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/324,493

(22) Filed: Nov. 26, 2008

(65) Prior Publication Data
US 2009/0140924 A1 Jun. 4, 2009

(30) Foreign Application Priority Data
Nov. 30, 2007 (JP) ............................. 2007-309995

(51) Int. Cl.
*G01S 1/02* (2010.01)
(52) U.S. Cl. ............................. 342/357.12; 342/357.02
(58) Field of Classification Search ............ 342/357.02, 342/357.08, 357.12, 451; 455/456.2, 456.3, 455/457
See application file for complete search history.

(56) References Cited
U.S. PATENT DOCUMENTS
6,609,080 B1 * 8/2003 Syrjarinne .................. 702/150
2005/0058337 A1 * 3/2005 Fujimura et al. ............ 382/159

FOREIGN PATENT DOCUMENTS
JP          2001-337156 A          12/2001

* cited by examiner

Primary Examiner—Dao L Phan
(74) Attorney, Agent, or Firm—Global IP Counselors, LLP

(57) ABSTRACT

A positioning method includes: executing a first positioning mode or a second positioning mode, a first positioning process that is performed using a least-square method based on a positioning signal and a second positioning process that is performed using a Kalman filter based on the positioning signal utilizing a positioning result obtained by the first positioning process as a base value being performed in the first positioning mode, and the second positioning process being further performed in the second positioning mode utilizing a positioning result obtained by the second positioning process as a base value; determining accuracy of a positioning result obtained by the second positioning process performed in the executed positioning mode; and changing the positioning mode to be executed to the first positioning mode or the second positioning mode corresponding to the accuracy.

13 Claims, 15 Drawing Sheets

FIG. 8

| TIME | POSITIONING MODE | MEASURE-MENT ERROR | VELOCITY VECTOR | LS LOCATED POSITION | KF LOCATED POSITION | DEAD-RECKONING POSITION | OUTPUT CANDIDATE POSITION | OUTPUT POSITION |
|---|---|---|---|---|---|---|---|---|
| t1 | SECOND POSITIONING MODE | σ1 | (VX1,VY1,VZ1) | — | (XK1,YK1,ZK1) | (XE1,YE1,ZE1) | (XK1,YK1,ZK1) | (X1,Y1,Z1) |
| t2 | FIRST POSITIONING MODE | σ2 | (VX2,VY2,VZ2) | (XL2,YL2,ZL2) | (XK2,YK2,ZK2) | (XE2,YE2,ZE2) | (XL2,YL2,ZL2) | (X2,Y2,Z2) |
| t3 | SECOND POSITIONING MODE | — | (VX3,VY3,VZ3) | (XL3,YL3,ZL3) | — | (XE3,YE3,ZE3) | (XL3,YL3,ZL3) | (X3,Y3,Z3) |
| ... | ... | ... | ... | ... | ... | ... | ... | ... |

· — →  TRUE PATH
———  PATH OF OUTPUT POSITION
WHEN PERFORMING PROCESS
ACCORDING TO EMBODIMENT

POSITIONING METHOD, POSITIONING DEVICE, AND PROGRAM

Japanese Patent Application No. 2007-309995 filed on Nov. 30, 2007, is hereby incorporated by reference in its entirety.

BACKGROUND

The present invention relates to a positioning method, a positioning device, and a program.

The global positioning system (GPS) is widely known as a satellite positioning system. The GPS is utilized for a positioning device provided in a portable telephone, a car navigation system, and the like. A GPS positioning device calculates its current position by calculating four parameters (i.e., three-dimensional coordinate values that indicate the position of the GPS positioning device and a clock error) based on information such as the positions of a plurality of GPS satellites and the pseudo-range between each GPS satellite and the GPS positioning device (i.e., positioning calculations).

However, since a positioning process that uses satellite signals from positioning satellites involves various error factors such as multipath effects, a positioning error may inevitably occur. Therefore, various technologies that reduce a positioning error have been proposed. For example, JP-A-2001-337156 discloses technology relating to a positioning process using a Kalman filter.

As the positioning process, a positioning process using a least-square method and a positioning process using a Kalman filter as disclosed in JP-A-2001-337156 have been widely known. However, these positioning processes have not been used in combination (i.e., only one of these processes has been generally used).

SUMMARY

According to one aspect of the invention, there is provided a positioning method comprising:

executing a first positioning mode or a second positioning mode, a first positioning process that is performed using a least-square method based on a positioning signal and a second positioning process that is performed using a Kalman filter based on the positioning signal utilizing a positioning result obtained by the first positioning process as a base value being performed in the first positioning mode, and the second positioning process being further performed in the second positioning mode utilizing a positioning result obtained by the second positioning process as a base value;

determining accuracy of a positioning result obtained by the second positioning process performed in the executed positioning mode; and changing the positioning mode to be executed to the first positioning mode or the second positioning mode corresponding to the accuracy.

BRIEF DESCRIPTION OF THE DRAWINGS

FIG. 8 is a view showing a data configuration example of measurement history data.

DESCRIPTION OF EXEMPLARY EMBODIMENTS

Figure 1:
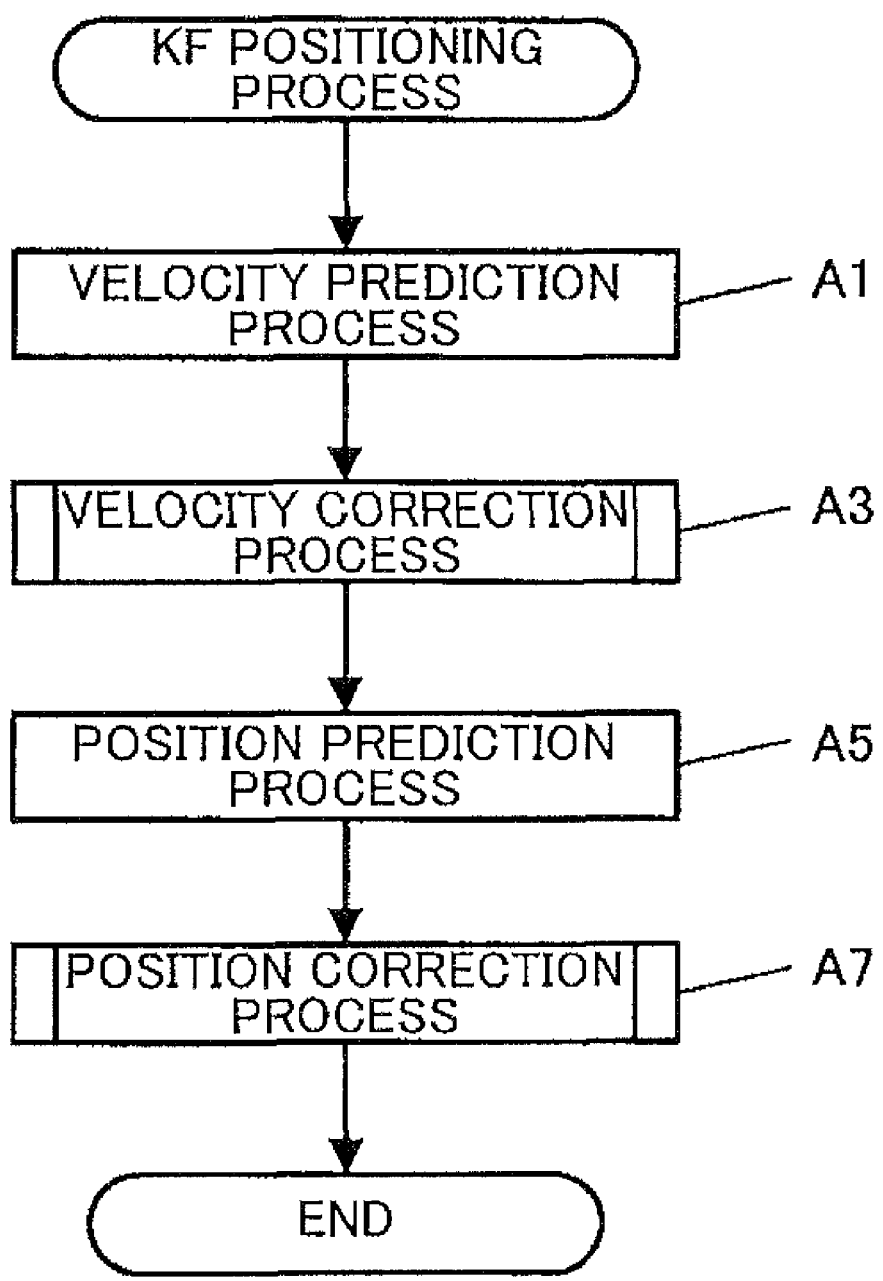
FIG. 1 is a flowchart showing the flow of a KF positioning process.

Several embodiments of the invention may improve the accuracy of a positioning result by appropriately utilizing two positioning processes in combination.

According to one embodiment of the invention, there is provided a positioning method comprising:

executing a first positioning mode or a second positioning mode, a first positioning process that is performed using a least-square method based on a positioning signal and a second positioning process that is performed using a Kalman filter based on the positioning signal utilizing a positioning result obtained by the first positioning process as a base value being performed in the first positioning mode, and the second positioning process being further performed in the second positioning mode utilizing a positioning result obtained by the second positioning process as a base value;

determining accuracy of a positioning result obtained by the second positioning process performed in the executed positioning mode; and changing the positioning mode to be executed to the first positioning mode or the second positioning mode corresponding to the accuracy.

According to another embodiment of the invention, there is provided a positioning device comprising:

a positioning section that executes a first positioning mode or a second positioning mode, a first positioning process that is performed using a least-square method based on a positioning signal and a second positioning process that is performed using a Kalman filter based on the positioning signal utilizing a positioning result obtained by the first positioning process as a base value being performed in the first positioning mode, and the second positioning process being further performed in the second positioning mode utilizing a positioning result obtained by the second positioning process as a base value;

a determination section that determines accuracy of a positioning result obtained by the second positioning process performed in the positioning mode executed by the positioning section; and a mode change section that changes the positioning mode to be executed to the first positioning mode or the second positioning mode corresponding to the accuracy obtained by the determination section.

According to another embodiment of the invention, there is provided a program that causes a computer to:

execute a first positioning mode or a second positioning mode, a first positioning process that is performed using a least-square method based on a positioning signal and a second positioning process that is performed using a Kalman filter based on the positioning signal utilizing a positioning result obtained by the first positioning process as a base value being performed in the first positioning mode, and the second positioning process being further performed in the second positioning mode utilizing a positioning result obtained by the second positioning process as a base value;

determine accuracy of a positioning result obtained by the second positioning process performed in the executed positioning mode; and change the positioning mode to be executed to the first positioning mode or the second positioning mode corresponding to the accuracy.

According to the above configuration, the first positioning mode is a mode in which the first positioning process is performed using the least-square method based on the positioning signal, and the second positioning process is performed using the Kalman filter based on the positioning signal utilizing the positioning result as a base value. Specifically, when executing the first positioning mode, the first positioning process is performed using the least-square method, and the second positioning process is then performed using the Kalman filter.

The second positioning mode is a mode in which the second positioning process is further performed utilizing the positioning result obtained by the preceding second positioning process as a base value. The second positioning process using the Kalman filter is performed in the first positioning mode and the second positioning mode. The second positioning mode is a mode in which the second positioning process using the Kalman filter is successively performed irrespective of whether the preceding positioning mode is the first positioning mode or the second positioning mode.

Accuracy of the positioning result obtained by the second positioning process performed in the executed positioning mode is determined, and the next or subsequent positioning mode is changed to the first positioning mode or the second positioning mode corresponding to the accuracy. When the positioning mode has been changed to the second positioning mode, the second positioning process using the Kalman filter is successively performed. When the positioning mode has been changed to the first positioning mode, the second positioning process using the Kalman filter is suspended. Specifically, the first positioning process using the least-square method is performed, and the second positioning process using the Kalman filter is then performed utilizing the positioning result as a base value.

This makes it possible to appropriately determine whether to continue the second positioning process using the Kalman filter or perform the first positioning process using the least-square method corresponding to the accuracy of the positioning result obtained by the second positioning process using the Kalman filter. As a result, the accuracy of the positioning result can be improved.

In the positioning method, the changing of the positioning mode may include changing the positioning mode to the second positioning mode when the executed positioning mode is the first positioning mode and the accuracy satisfies a given accuracy condition.

In the positioning device, the mode change section may change the positioning mode to the second positioning mode when the positioning mode executed by the positioning section is the first positioning mode and the accuracy satisfies a given accuracy condition.

According to the above configuration, the next or subsequent positioning mode is changed to the second positioning mode when the current positioning mode is the first positioning mode and the positioning result obtained by the second positioning process has been determined to be accurate.

The positioning method may further comprise:

determining whether or not an elapsed time from the preceding second positioning process satisfies a given overtime condition; and changing the positioning mode to the first positioning mode when the executed positioning mode is the second positioning mode and the elapsed time has been determined to satisfy the overtime condition.

The positioning device may further comprise:

an overtime condition determination section that determines whether or not an elapsed time from the preceding second positioning process satisfies a given overtime condition, the mode change section may change the positioning mode to the first positioning mode when the positioning mode executed by the positioning section is the second positioning mode and the overtime condition determination section has determined that the elapsed time has satisfied the overtime condition.

According to the above configuration, the next or subsequent positioning mode can be changed to the first positioning mode when the current positioning mode is the second positioning mode and it has been determined that a long period of time has elapsed from the preceding second positioning process.

The positioning method may further comprise:

determining a located position calculated by the second positioning process in the first positioning mode to be a candidate position for a current position when the executed positioning mode is the first positioning mode and the accuracy satisfies a given accuracy condition, and determining a located position calculated by the first positioning process in the first positioning mode to be the candidate position for the current position when the executed positioning mode is the first positioning mode and the accuracy does not satisfy the given accuracy condition; and determining an output position using the candidate position for the current position, and outputting the output position.

The positioning device may further comprise:

a candidate position determination section that determines a located position calculated by the second positioning process in the first positioning mode to be a candidate position for a current position when the positioning mode executed by the positioning section is the first positioning mode and the accuracy satisfies a given accuracy condition, and determines a located position calculated by the first positioning process in the first positioning mode to be the candidate position for the current position when the positioning mode executed by the positioning section is the first positioning mode and the accuracy does not satisfy the given accuracy condition; and an output section that determines an output position using the candidate position for the current position, and outputs the output position.

According to the above configuration, the located position calculated by the second positioning process is determined to be the candidate position for the current position when the current positioning mode is the first positioning mode and the positioning result obtained by the second positioning process has been determined to be accurate. The located position calculated by the first positioning process is determined to be the candidate position for the current position when the positioning result obtained by the second positioning process has been determined to be inaccurate. A highly reliable output position can be obtained by determining the output position using the candidate position for the current position thus determined.

The positioning method may further comprise:

determining a located position calculated by the second positioning process in the second positioning mode to be a candidate position for a current position when the executed positioning mode is the second positioning mode and the accuracy satisfies a given accuracy condition;

executing the first positioning process when the executed positioning mode is the second positioning mode and the accuracy does not satisfy the given accuracy condition, and determining a located position calculated by the first positioning process to be the candidate position for the current position; and determining an output position using the candidate position for the current position, and outputting the output position.

The positioning device may further comprise:

a first candidate position determination section that determines a located position calculated by the second positioning process in the second positioning mode to be a candidate position for a current position when the positioning mode executed by the positioning section is the second positioning mode and the accuracy satisfies a given accuracy condition:

a second candidate position determination section that executes the first positioning process when the positioning mode executed by the positioning section is the second positioning mode and the accuracy does not satisfy the given accuracy condition, and determines a located position calculated by the first positioning process to be the candidate position for the current position; and an output section that determines an output position using the candidate position for the current position, and outputs the output position.

According to the above configuration, the located position calculated by the second positioning process is determined to be the candidate position for the current position when the current positioning mode is the second positioning mode and the positioning result obtained by the second positioning process has been determined to be accurate. The first positioning process is executed when the positioning result obtained by the second positioning process has been determined to be inaccurate, and the located position calculated by the first positioning process is determined to be the candidate position for the current position. A highly reliable located position can be obtained by determining the output position using the candidate position for the current position thus determined.

The positioning method may further comprise:

determining a located position calculated by the second positioning process in the second positioning mode to be a candidate position for a current position when the executed positioning mode is the second positioning mode and the accuracy satisfies a given accuracy condition;

executing the first positioning process using positioning signals which have been used for the second positioning process in the second positioning mode and from which a positioning signal that satisfies a given low accuracy factor condition is excluded, when the executed positioning mode is the second positioning mode and the accuracy does not satisfy the given accuracy condition, and determining a located position calculated by the first positioning process to be the candidate position for the current position; and determining an output position using the candidate position for the current position, and outputting the output position.

The positioning device may further comprise:

a first candidate position determination section that determines a located position calculated by the second positioning process in the second positioning mode to be a candidate position for a current position when the positioning mode executed by the positioning section is the second positioning mode and the accuracy satisfies a given accuracy condition;

a second candidate position determination section that executes the first positioning process using positioning signals which have been used for the second positioning process in the second positioning mode and from which a positioning signal that satisfies a given low accuracy factor condition is excluded, when the positioning mode executed by the positioning section is the second positioning mode and the accuracy does not satisfy the given accuracy condition, and determines a located position calculated by the first positioning process to be the candidate position for the current position; and an output section that determines an output position using the candidate position for the current position, and outputs the output position.

According to the above configuration, the located position calculated by the second positioning process is determined to be the candidate position for the current position when the current positioning mode is the second positioning mode and the positioning result obtained by the second positioning process has been determined to be accurate. When the positioning result obtained by the second positioning process has been determined to be inaccurate, the first positioning process is executed using the positioning signals which have been used for the second positioning process and from which a positioning signal that reduces the accuracy is excluded. This makes it possible to calculate a more reliable candidate position for the current position even if the positioning result obtained by the second positioning process is inaccurate.

The positioning method may further comprise:

determining the output position by correcting the candidate position for the current position by performing a filter process determined in advance corresponding to whether the candidate position is the located position calculated by the first positioning process or the located position calculated by the second positioning process.

In the positioning device, the output section may determine the output position by correcting the candidate position for the current position by performing a filter process determined in advance corresponding to whether the candidate position is the located position calculated by the first positioning process or the located position calculated by the second positioning process.

According to the above configuration, the candidate position for the current position can be appropriately corrected by performing the filter process corresponding to the type of candidate position for the current position. As a result, a more reliable output position can be obtained.

Examples of preferred embodiments of the invention are described below with reference to the drawings. The following description is given taking a portable telephone as an example of an electronic instrument that includes a positioning device and the GPS as an example of a positioning system. Note that embodiments to which the invention may be applied are not limited thereto.

1. Principle

A portable telephone 1 receives a GPS satellite signal (i.e., positioning signal) transmitted (sent) from a GPS satellite (i.e., positioning satellite), and calculates GPS satellite information (e.g., position, moving direction, and velocity) based on a navigation message such as GPS satellite orbit information (ephemeris data and almanac data) superimposed on the received GPS satellite signal. The GPS satellite signal is a spread-spectrum-modulated signal referred to as a coarse and acquisition (C/A) code. The GPS satellite signal is superimposed on a carrier in an L1 band (carrier frequency: 1.57542 GHz).

Note that four GPS satellites are placed in each of the six orbital planes. In principle, four or more satellites can be necessarily observed under constellation from anywhere on the earth. In the following description, a GPS satellite that has transmitted the acquired GPS satellite signal is referred to as "acquired satellite" in order to distinguish the GPS satellite from other GPS satellites.

The portable telephone 1 calculates the radio wave propagation time from the acquired satellite to the portable telephone 1 based on the difference between the reception time of the GPS satellite signal specified by a crystal clock provided in the portable telephone 1 and the transmission time of the received GPS satellite signal from the GPS satellite. The portable telephone 1 calculates the distance (pseudo-range) from the acquired satellite to the portable telephone 1 by multiplying the calculated radio wave propagation time by the velocity of light.

The portable telephone 1 calculates its current position by calculating four parameters (i.e., three-dimensional coordinate values that indicate the position of the portable telephone 1 and a clock error) based on information such as the satellite information relating to a plurality of acquired satellites and the pseudo-range between each acquired satellite and the portable telephone 1 (i.e., positioning calculations).

In this embodiment, two positioning modes are defined in advance. The two positioning modes include a first positioning mode in which the portable telephone 1 performs a first positioning process using a least-square method based on the acquired GPS satellite signals (hereinafter referred to as "LS positioning process"), and then performs a second positioning process using a Kalman filter based on the GPS satellite signals utilizing the positioning result as a base value (hereinafter referred to as "KF positioning process"), and a second positioning mode in which the portable telephone 1 further performs the KF positioning process utilizing the positioning result obtained by the preceding KF positioning process as a base value.

The portable telephone 1 determines accuracy of the positioning result obtained by the KF positioning process performed in the current positioning mode, and changes the next or subsequent positioning mode to the first positioning mode or the second positioning mode corresponding to the accuracy. The details of the positioning mode change process that is one of the characteristic processes according to this embodiment are described later. Since the LS positioning process is a known process, description thereof is omitted. The details of the KF positioning process according to this embodiment are described below.

The Kalman filter is an estimation method based on the probability theory that estimates the state quantity that changes every moment utilizing an observed value including an error. In this embodiment, the state of the portable telephone 1 is indicated by a state vector X, and the error covariance between the state vector X and the true value is indicated by an error covariance matrix P.

The state vector X is an eight-dimensional vector that contains the three-dimensional position vector (x, y, z), the clock bias (b), the three-dimensional velocity vector (u, v, w), and the clock drift (d) of the portable telephone 1 as components. The error covariance matrix P is an 8×8 matrix that indicates the error covariance between each component of the state vector X.

The KF positioning process includes a prediction process and a correction process of the state vector X and the error covariance matrix P. In the following description, a unit that indicates the elapsed time of the calculation process (i.e., a given time interval of the calculation process) is referred to as "one time", and the current position of the portable telephone 1 is calculated every time.

FIG. 1 is a flowchart showing the flow of the KF positioning process according to this embodiment.

The velocity of the portable telephone 1 is predicted (velocity prediction process) (step A1). Specifically, predicted values of the current state vector X and the current error covariance matrix P are calculated according to the following expressions (1) and (2).

$$X_t^- = X_{t-1}^+ \quad (1)$$

$$P_t^- = \phi_t P_{t-1}^+ \phi_t^T + Q_{t-1} \quad (2)$$

where, the subscript "t" indicates time, the superscript "−" indicates a predicted value, the superscript "+" indicates a corrected value, and the superscript "T" indicates a transposed matrix. "φ" indicates an 8×8 matrix referred to as a state transition matrix, and "Q" indicates an 8×8 matrix referred to as a process noise. The rows and the columns of the state transition matrix φ and the process noise Q respectively correspond to the eight-dimensional components (x, y, z, b, u, v, w, d) of the state vector X.

In this embodiment, calculations are performed using the state transition matrix φ shown by the following expression (3).

$$\phi = \begin{bmatrix} 1 & 0 & 0 & 0 & dt & 0 & 0 & 0 \\ 0 & 1 & 0 & 0 & 0 & dt & 0 & 0 \\ 0 & 0 & 1 & 0 & 0 & 0 & dt & 0 \\ 0 & 0 & 0 & 1 & 0 & 0 & 0 & dt \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad (3)$$

where, "dt" indicates the difference between the time when the preceding KF positioning process was performed and the current time.

In the velocity prediction process, the corrected value of the state vector X at a time one time before the current time is used as the predicted value of the current state vector X (see expression (1)). Specifically, the current velocity of the portable telephone 1 is predicted to be the same as the velocity of the portable telephone 1 calculated at a time one time before the current time. After completion of the velocity prediction process, the predicted velocity is corrected (velocity correction process) (step A3).

Figure 2:
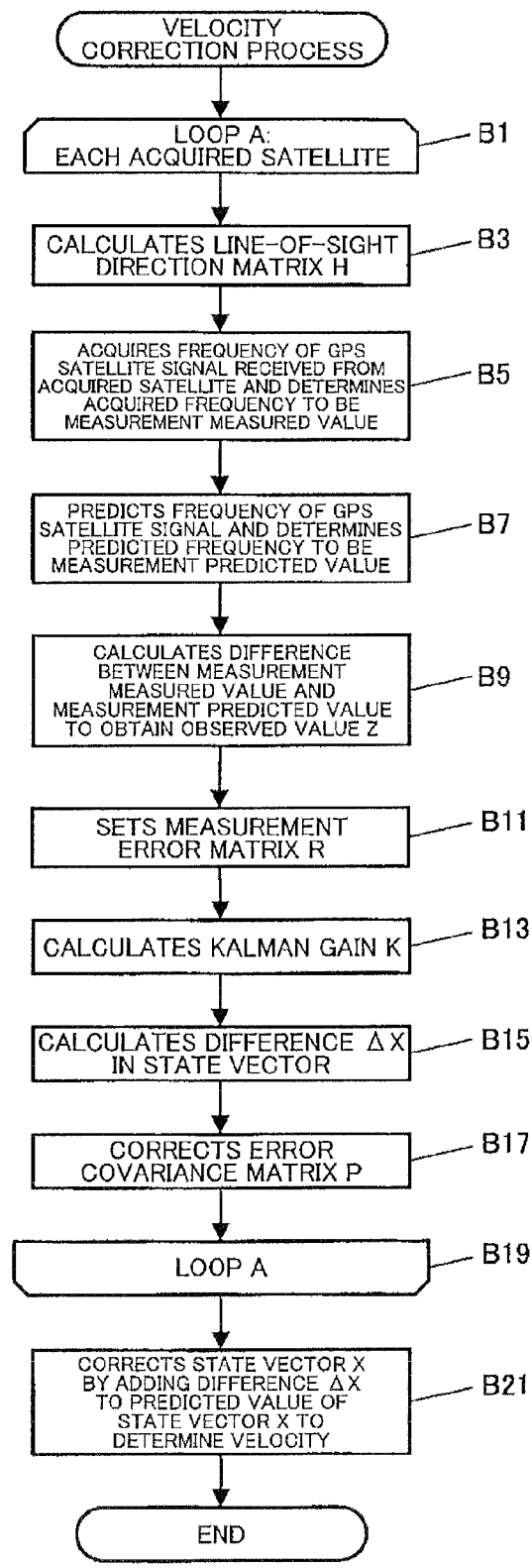
FIG. 2 is a flowchart showing the flow of the velocity correction process.

FIG. 2 is a flowchart showing the flow of the velocity correction process.

In the velocity correction process, a loop A process is repeated corresponding to each acquired satellite (steps B11 to B19). In the loop A, a line-of-sight direction matrix "H" that indicates the line-of-sight direction from the portable telephone 1 to the acquired satellite is calculated based on information relating to the position, moving direction, and velocity of the acquired satellite (satellite information) and information relating to the position, moving direction, and velocity of the portable telephone 1 obtained from the predicted value of the state vector X (hereinafter inclusively referred to as "portable telephone information") (step B3).

The reception frequency of the GPS satellite signal from the acquired satellite is acquired and determined to be a reception frequency measured value (the measured value relating to the received GPS satellite signal is hereinafter referred to as "measurement measured value") (step B5). The frequency of the GPS satellite signal is 1.57542 GHz. The reception frequency of the GPS satellite signal at the portable telephone 1 changes corresponding to a change in relative moving direction and moving velocity of the GPS satellite and the portable telephone 1. This frequency shift occurs due to a Doppler frequency. The reception frequency is a frequency that has been shifted due to the Doppler frequency.

The reception frequency of the GPS satellite signal is predicted based on the satellite information relating to the acquired satellite and the portable telephone information and determined to be a reception frequency predicted value (the predicted value of the measurement measured value is hereinafter referred to as "measurement predicted value") (step B7). The difference between the measurement measured value acquired in the step B5 and the measurement predicted value calculated in the step B7 is calculated as to the reception frequency to obtain an observed value "Z" of the acquired satellite (step B9).

The amounts of change in the three-dimensional velocity vector (u, v, w) and the clock drift (d) of the state vector X can be calculated by inputting the difference between the measured value and the predicted value of the reception frequency of the GPS satellite signal to the Kalman filter. In this case, the amounts of change in the three-dimensional position vector (x, y, z) and the clock bias (b) of the state vector X are zero.

A measurement error matrix "R" that indicates a measurement error of the observed value Z calculated in the step B9 is set (step B11). A Kalman gain "K" is then calculated according to the following expression (4) using the predicted value of the error covariance matrix P calculated by the velocity prediction process, the line-of-sight direction matrix H, and the measurement error matrix R (step B13.

$$K_t = P_t^- H_t^T (H_t P_t^- H_t^T + R_t)^{-1} \quad (4)$$

A difference ΔX in the state vector is calculated according to the following expression (5) using the Kalman gain K, the observed value Z, and the line-of-sight direction matrix H (step B15).

$$\Delta X_t = \Delta X_t + K_t (Z_t - H_t \Delta X_t) \quad (5)$$

The error covariance matrix P is corrected according to the following expression (6) using the Kalman gain K, the line-of-sight direction matrix H, and the predicted value of the error covariance matrix P (step B17).

$$P_t^+ = (I - K_t H_t) P_t^- \quad (6)$$

where, "I" indicates a unit matrix.

The process in the steps B3 to B17 is sequentially performed on all of the acquired satellites to update the difference ΔX in the state vector and the error covariance matrix P. The state vector X is corrected by adding the difference ΔX in the state vector to the predicted value of the state vector X calculated by the velocity prediction process according to the following expression (7) to determine the velocity of the portable telephone 1 (step B21).

$$X_t^+ = X_t^- + \Delta X_t \quad (7)$$

In the state vector X obtained by the step B21, the three-dimensional velocity vector (u, v, w) and the clock drift (d) have been corrected based on the predicted value. This is because the difference ΔX in the state vector has been calculated using the difference between the measurement measured value and the measurement predicted value of the reception frequency of the GPS satellite signal as the observed value Z. The velocity calculated from the three-dimensional velocity vector (u, v, w) of the corrected state vector X is the velocity of the portable telephone 1 at the current time.

Again referring to the KF positioning process shown in FIG. 1, the position of the portable telephone 1 is predicted (position prediction process) after completion of the velocity correction process (step A5). Specifically, the corrected value of the state vector X obtained by the velocity correction process is multiplied by the state transition matrix φ according to the following expression (8) to calculate the predicted value of the state vector X.

$$X_t^- = \phi X_t^{30} \quad (8)$$

As is clear from the expression (3), the diagonal components of the 3×3 matrix portion of the state transition matrix φ corresponding to the three-dimensional velocity vector (u, v, w) are the difference dt between the preceding time and the current time. Therefore, when the corrected value of the state vector X is multiplied by the state transition matrix φ, the predicted moving distance is added to the located position at a time one time before the current time so that the current predicted position of the portable telephone 1 is calculated. After completion of the position prediction process, the predicted position is corrected (position correction process) (step A7).

Figure 3:
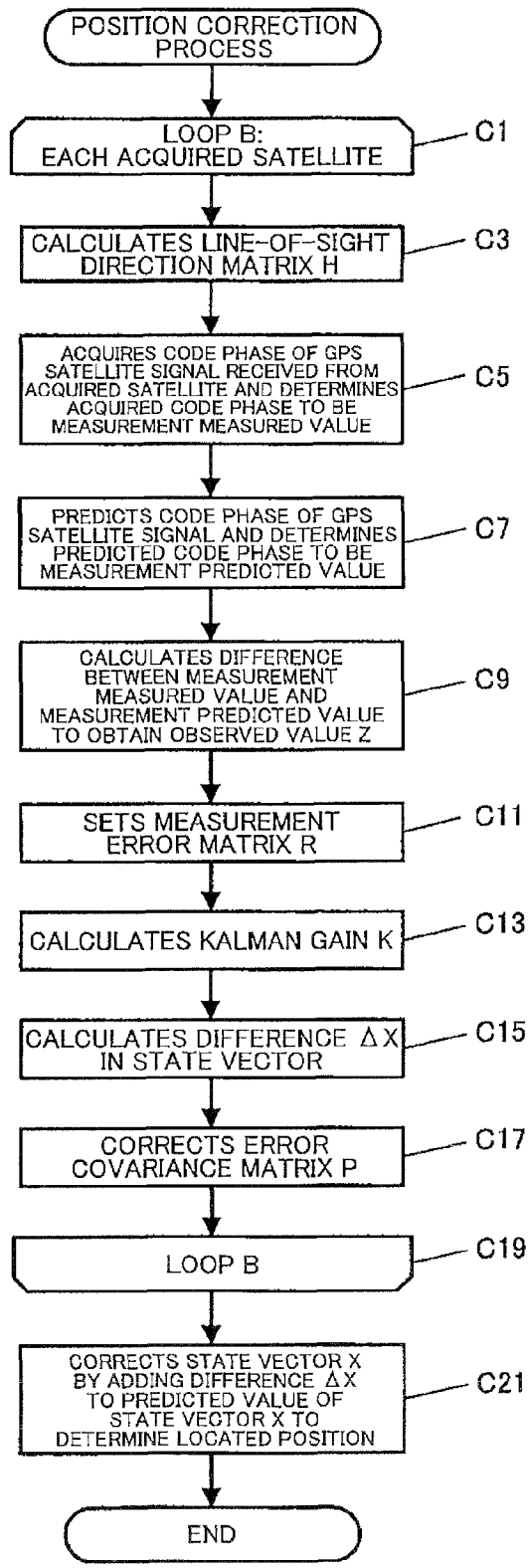
FIG. 3 is a flowchart showing the flow of a position correction process.

FIG. 3 is a flowchart showing the flow of the position correction process.

The flow of the position correction process is almost identical to the flow of the velocity correction process. Therefore, the following description mainly focuses on the difference between the position correction process and the velocity correction process. In the position correction process, the code phase of the GPS satellite signal received from the acquired satellite is acquired and determined to be the measurement measured value of the code phase (step C5), and the code phase of the GPS satellite signal is predicted and determined to be the measurement predicted value of the code phase (step C7). The difference between the measurement measured value and the measurement predicted value of the code phase is calculated as the observed value Z that is the input value of the Kalman filter (step C9).

Note that the term "code phase" refers to the phase of the C/A code modulated in the GPS satellite signal. The code phase is a distance equivalent value that indicates the distance between the GPS satellite and the portable telephone 1. It may be conceptually considered that the C/A codes line up successively between the GPS satellite and the portable telephone 1. The distance between the GPS satellite and the portable telephone 1 is not necessarily a multiple of the length of the C/A code. In this case, a length obtained by adding a fraction to a multiple of the length of the C/A code corresponds to the distance between the GPS satellite and the portable telephone 1. A phase corresponding to the fraction is the code phase.

Note that the code phase may be converted into distance. Therefore, the position correction process performed using the difference between the measurement measured value and the measurement predicted value of the code phase as the observed value Z is equivalent to the position correction process performed using the difference between the measured value and the predicted value of the distance (length obtained by adding a fraction to a multiple of the length of the C/A code) between the acquired satellite and the portable telephone 1 as the observed value Z. Therefore, the code phase is a value corresponding to the distance between the acquired satellite and the portable telephone 1.

The amounts of change in the three-dimensional position vector (x, y, z) and the clock bias (b) of the state vector X can be calculated by inputting the difference between the measurement measured value and the measurement predicted value of the code phase of the GPS satellite signal to the Kalman filter. In this case, the amounts of change in the three-dimensional velocity vector (u, v, w) and the clock drift (d) are zero.

The process in the steps C3 to C17 is sequentially performed on all of the acquired satellites to update the difference ΔX in the state vector and the error covariance matrix P. The state vector X is corrected by adding the difference ΔX in the state vector to the predicted value of the state vector X calculated by the position prediction process according to the expression (7) to determine the position of the portable telephone 1 (step C21).

In the state vector X obtained by the step C21, the three-dimensional position vector (x, y, z) and the clock bias (b) have been corrected based on the predicted value. This is because the difference ΔX in the state vector has been calculated using the difference between the measured value and the predicted value of the code phase of the GPS satellite signal as the observed value Z. The position indicated by the three-dimensional position vector (x, y, z) of the corrected state vector X is the located position at the current time.

2. Functional Configuration

Figure 4:
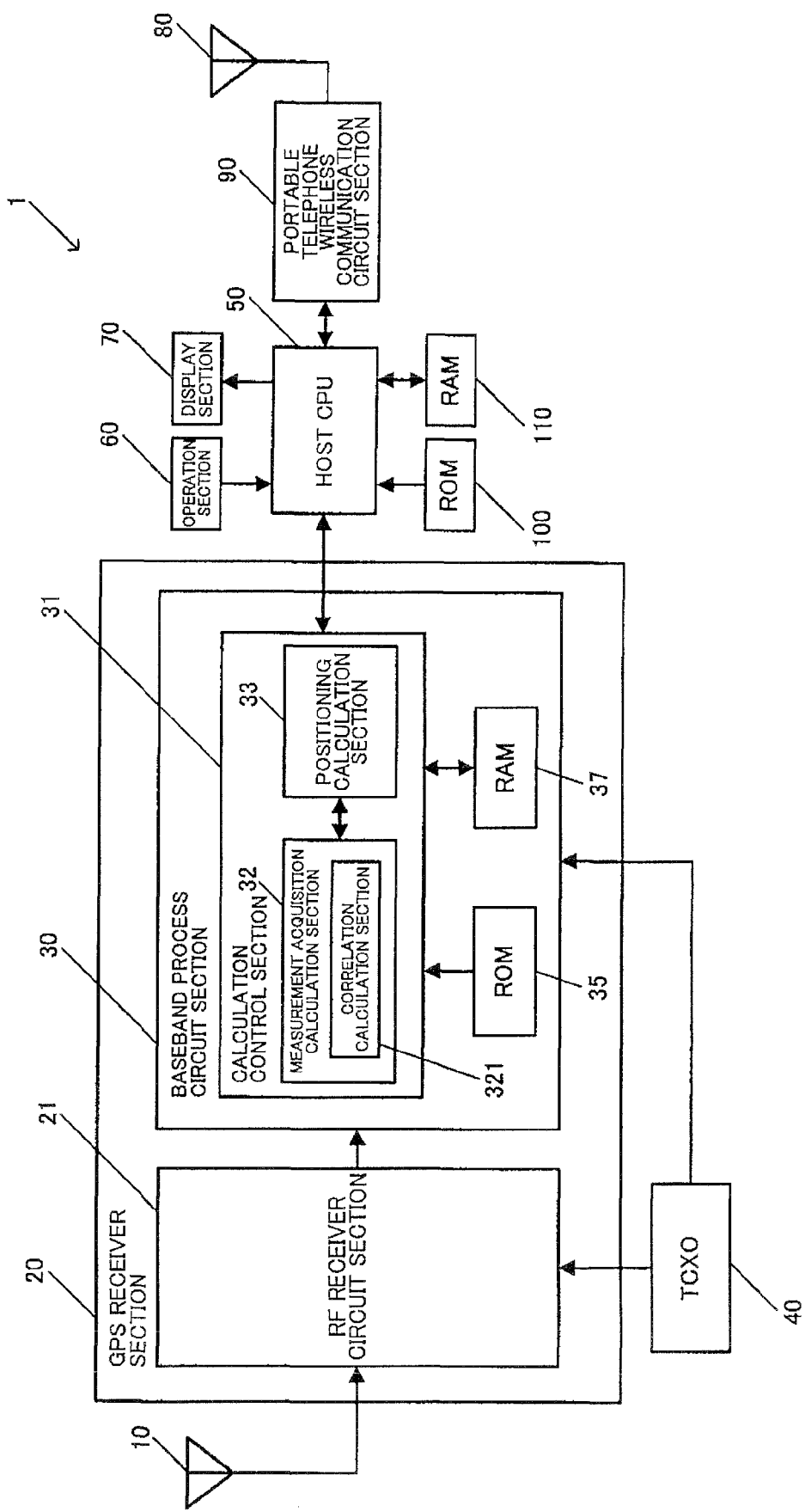
FIG. 4 is a block diagram showing the functional configuration of a portable telephone.

FIG. 4 is a block diagram showing the functional configuration of the portable telephone 1. The portable telephone 1 includes a GPS antenna 10, a GPS receiver section 20, a temperature-compensated crystal oscillator (TCXO) 40, a host central processing unit (CPU) 50, an operation section 60, a display section 70, a portable telephone antenna 80, a portable telephone wireless communication circuit section 90, a read-only memory (ROM) 100, and a random access memory (RAM) 110.

The GPS antenna 10 is an antenna that receives a radio frequency (RF) signal including a GPS satellite signal transmitted from a GPS satellite. The GPS antenna 10 outputs the received signal to the GPS receiver section 20.

The GPS receiver section 20 is a positioning section that locates the current position of the portable telephone 1 based on the signal output from the GPS antenna 10. The GPS receiver section 20 is a functional block corresponding to a GPS receiver. The GPS receiver section 20 includes an RF receiver circuit section 21 and a baseband process circuit section 30. The RF receiver circuit section 21 and the baseband process circuit section 30 may be produced as different large scale integrated (LSI) circuits, or may be incorporated in one chip.

The RF receiver circuit section 21 is a high-frequency signal (RF signal) circuit block. The RF receiver circuit section 21 generates an RF signal multiplication oscillation signal by dividing or multiplying the frequency of the oscillation signal generated by the TCXO 40. The RF receiver circuit section 21 down-converts the RF signal output from the GPS antenna 10 into an intermediate-frequency signal (hereinafter referred to as "IF signal") by multiplying the RF signal output by the generated oscillation signal, subjects the IF signal to amplification and the like, converts the resulting signal into a digital signal using an A/D converter, and outputs the resulting digital signal to the baseband process circuit section 30.

The baseband process circuit section 30 is a positioning section that acquires/extracts the GPS satellite signal by performing a correlation process and the like on the IF signal output from the RF receiver circuit section 21, decodes the data contained in the GPS satellite signal to extract a navigation message, time information, and the like, and performs positioning calculations. The baseband process circuit section 30 includes a calculation control section 31, a ROM 35, and a RAM 37. The calculation control section 31 includes a measurement acquisition calculation section 32 and a positioning calculation section 33.

The measurement acquisition calculation section 32 and the positioning calculation section 33 may be produced as different LSI circuits, or may be incorporated in one chip. In this embodiment, the positioning calculation section 33 performs current position positioning calculations. Note that the host CPU 50 may perform some or all of the processes performed by the positioning calculation section 33.

The measurement acquisition calculation section 32 is a circuit section that acquires/tracks the GPS satellite signal from the received signal (IF signal) output from the RF receiver circuit section 21. The measurement acquisition calculation section 32 includes a correlation calculation section 321. The measurement acquisition calculation section 32 acquires information such as the reception frequency and the code phase of the acquired/tracked GPS satellite signal, and outputs the acquired information to the positioning calculation section 33 as the measurement measured value.

The correlation calculation section 321 acquires the GPS satellite signal by performing a coherent process (correlation process) that calculates the correlation between the C/A code included in the received signal and a code replica using FFT calculations or the like, and performing an incoherent process (correlation value integration process) that integrates the correlation values (coherent process results) over given seconds (e.g., one second) to calculate an integrated correlation value. The code replica is a signal that is pseudo-generated and simulates the C/A code (i.e., pseudo random noise (PRN) code) included in the acquisition target GPS satellite signal. The C/A code includes 1023 chips.

If the acquisition target GPS satellite signal is correct, the C/A code included in the GPS satellite signal coincides with the code replica (success). If the acquisition target GPS satellite signal is incorrect, the C/A code included in the GPS satellite signal does not coincide with the code replica (failure). Therefore, whether or not the GPS satellite signal has been acquired successfully can be determined by determining the peak of the calculated integrated correlation value. The GPS satellite signal can be acquired by performing correlation calculations on the received signal while changing the code replica.

The correlation calculation section 321 performs the coherent process while changing the frequency of the code replica signal and the phase when calculating the correlation between the C/A code and the code replica. The integrated correlation value becomes a maximum when the frequency of the code replica signal coincides with the frequency of the received signal and the phase of the C/A code coincides with the phase of the code replica.

Specifically, the correlation calculation section 321 sets a range of a given frequency and code phase corresponding to the acquisition target GPS satellite signal to be a search range. The correlation calculation section 321 performs correlation calculations in the phase direction for detecting the start position (code phase) of the C/A code and correlation calculations in the frequency direction for detecting the frequency within the search range. The search range is defined within a frequency sweep range around 1.57542 GHz (i.e., the carrier frequency of the GPS satellite signal) and a code phase range of 1023 chips (i.e., the chip length of the C/A code).

The positioning calculation section 33 is a circuit section that performs positioning calculations that calculate the current position of the portable telephone 1 based on the measurement measured value input from the measurement acquisition calculation section 32. In this embodiment, the positioning calculation section 33 calculates the current position of the portable telephone 1 while changing the positioning mode between the first positioning mode and the second positioning mode.

Figure 5:
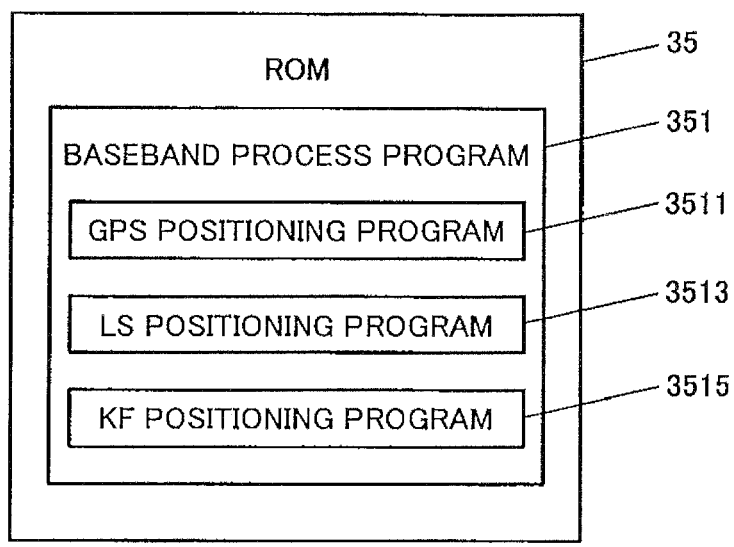
FIG. 5 is a view showing an example of data stored in a ROM.

FIG. 5 is a view showing an example of data stored in the ROM 35. The ROM 35 stores a baseband process program 351 that is read by the positioning calculation section 33 and executed as a baseband process (see FIG. 9). The baseband process program 351 includes a GPS positioning program 3511 executed as a GPS positioning process (see FIGS. 10 and 11), an LS positioning program 3513 executed as an LS positioning process, and a KF positioning program 3515 executed as the KF positioning process (see FIGS. 1 to 3) as subroutines.

In the baseband process, the positioning calculation section 33 performs a GPS positioning process to determine an output position, and outputs the output position to the host CPU 50. The details of the baseband process are described later using a flowchart.

In the GPS positioning process, the positioning calculation section 33 performs the positioning process while changing the positioning mode between the first positioning mode and the second positioning mode to determine an output candidate position, and performs a PV filter process (i.e., filter process) to correct the output candidate position to determine the output position. The details of the GPS positioning process are described later using a flowchart.

In the LS positioning process, the positioning calculation section 33 performs positioning calculations on a plurality of acquired satellites using the least-square method to calculate the current position of the portable telephone 1. The LS positioning process is known in the art. Therefore, detailed description thereof is omitted.

In the KF positioning process, the positioning calculation section 33 performs positioning calculations on a plurality of acquired satellites using a Kalman filter to calculate the current position of the portable telephone 1. The KF positioning process has been described above with reference to FIGS. 1 to 3.

Figure 6:
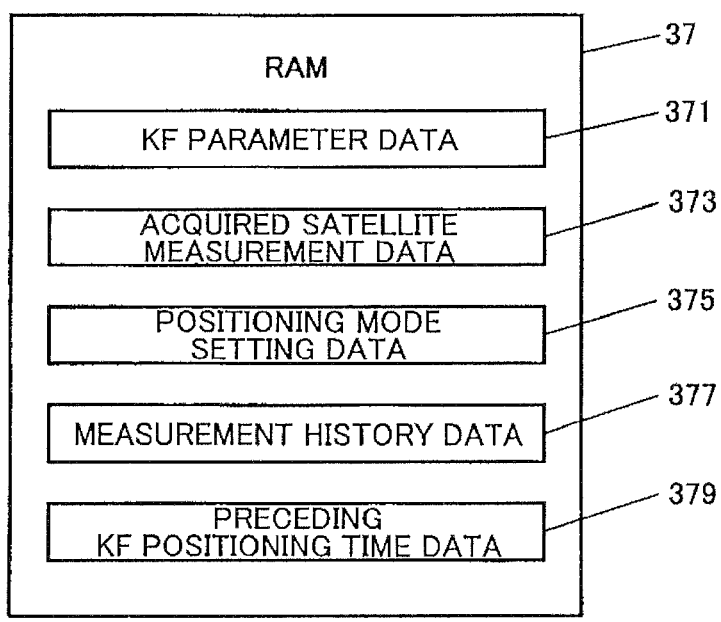
FIG. 6 is a view showing an example of data stored in a RAM.

FIG. 6 is a view showing an example of data stored in the RAM 37. The RAM 37 stores KF parameter data 371, acquired satellite measurement data 373, positioning mode setting data 375, measurement history data 377, and preceding KF positioning time data 379.

The values of various parameters of the Kalman filter used for the KF positioning process (hereinafter referred to as "KF parameters") are stored as the KF parameter data 371. The KF parameter data 371 is updated by the positioning calculation section 33 during the KF positioning process.

Figure 7:
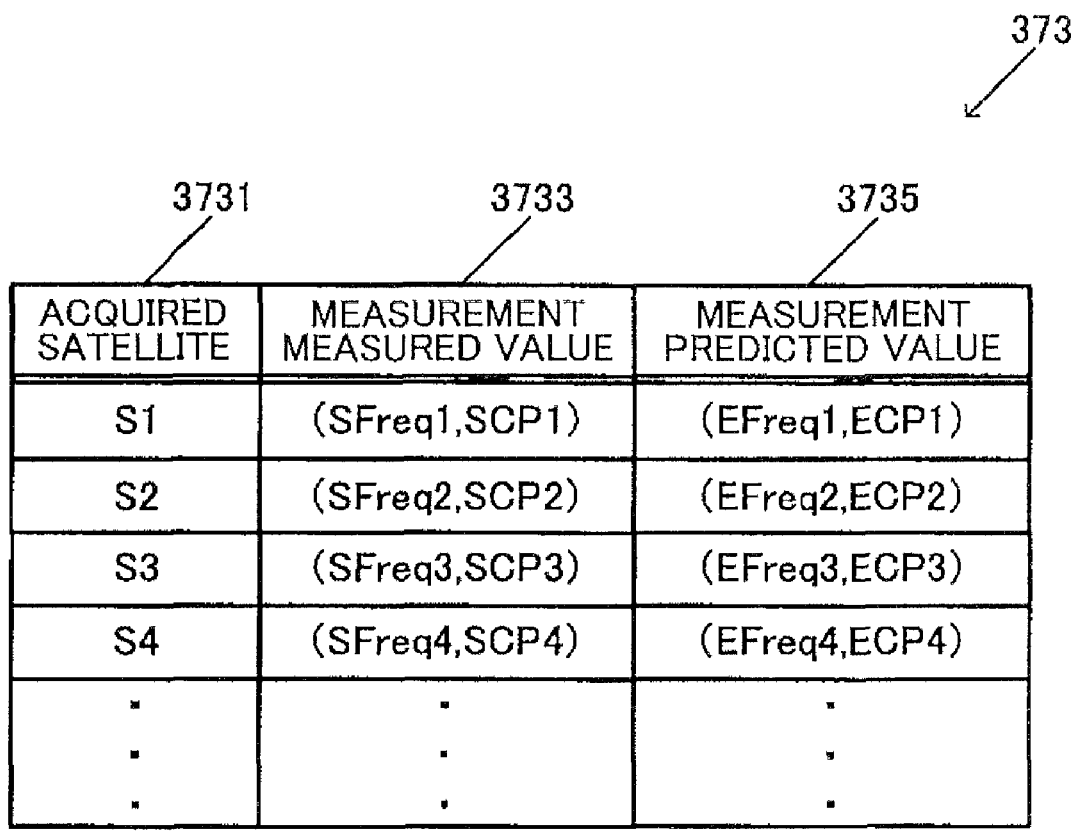
FIG. 7 is a view showing a data configuration example of acquired satellite measurement data.

FIG. 7 is a view showing a data configuration example of the acquired satellite measurement data 373. An acquired satellite 3731, a measurement measured value 3733, and a measurement predicted value 3735 are stored as the acquired satellite measurement data 373. The number of the acquired satellite is stored as the acquired satellite 3731. The measured value and the predicted value of the reception frequency and the code phase of the GPS satellite signal received from the acquired satellite are respectively stored as the measurement measured value 3733 and the measurement predicted value 3735.

For example, the measurement measured values of the reception frequency and the code phase of an acquired satellite S1 are SFreq1 and SCP1, respectively. The measurement predicted values of the reception frequency and the code phase of the acquired satellite S1 are EFreq1 and ECP1, respectively. In the KF positioning process, the positioning calculation section 33 performs the velocity correction process and the position correction process using the difference between the measurement measured value and the measurement predicted value as the observed value Z.

The positioning mode setting data 375 is data relating to the positioning mode set by the positioning calculation section 33 during the GPS positioning process as the positioning mode at the next time. The first positioning mode or the second positioning mode is stored as the positioning mode setting data 375.

FIG. 8 is a view showing a data configuration example of the measurement history data 377. A positioning mode 3772, an estimated error 3773, a velocity vector 3774, an LS located position 3775, a KF located position 3776, a dead-reckoning position 3777, an output candidate position 3778, and an output position 3779 are stored as the measurement history data 377 corresponding to a time 3771.

The positioning mode 3772 indicates the positioning mode set at the corresponding time. The estimated error 3773 indicates a value of an error estimated to be included in the KF located position 3776, and is calculated by the following expression (9).

$$\sigma = \sqrt{P_{xx} + P_{yy} + P_{zz}} \tag{9}$$

where, $\sigma$ indicates an estimated error, and $P_{xx}$, $P_{yy}$, and $P_{zz}$ respectively indicate an xx component, a yy component, and a zz component of the 8×8 error covariance matrix P.

The three-dimensional velocity vector calculated by the velocity correction process is stored as the velocity vector 3774 when the KF positioning process has been performed. When the KF positioning process has not been performed, the three-dimensional velocity vector measured by the LS positioning process based on a change in the Doppler frequency of the GPS satellite signal received from the acquired satellite is stored as the velocity vector 3774. The velocity vector 3774 is indicated by the three-dimensional coordinate vector in the terrestrial reference frame, for example.

The LS located position 3775 indicates the located position calculated by the LS positioning process. The KF located position 3776 indicates the located position calculated by the KF positioning process. The dead-reckoning position 3777 indicates the position calculated by a dead-reckoning process using the output position 3779 at a time one time before the current time and the velocity vector 3774 at the current time.

The output candidate position 3778 indicates the position calculated as a candidate position for the current position. The output candidate position 3778 is the LS located position in the first positioning mode, and is the LS located position or the KF located position in the second positioning mode. The output position 3779 indicates the position calculated as the position output to the host CPU 50. The output position 3779 is determined by correcting the output candidate position 3778 by the PV filter process. The LS located position 3775 to the output position 3779 are indicated by the three-dimensional position coordinates in the terrestrial reference frame, for example.

For example, the positioning mode at a time t1 is the second positioning mode. The estimated error is σ1, and the velocity vector is (VX1, VY1, VZ1). The LS located position is "–(none)", the KF located position is (XK1, YK1, ZK1), and the dead-reckoning position is (XE1, YE1, ZE1). The output candidate position is (XK1, YK1, ZK1) (i.e., KF located position), and the output position is (X1, Y1, Z1). The measurement history data 377 is updated every second by the positioning calculation section 33 during the GPS positioning process in principle.

The time when the preceding KF positioning process has been performed (hereinafter referred to as "preceding KF positioning time") is stored as the preceding KF positioning time data 379. In the following description, the KF located position calculated at the preceding KF positioning time is referred to as "preceding KF located position".

The TCXO 40 is a temperature-compensated crystal oscillator that generates an oscillation signal at a given oscillation frequency. The TCXO 40 outputs the generated oscillation signal to the RF receiver circuit section 21 and the baseband process circuit section 30.

The host CPU 50 controls each section of the portable telephone 1 based on various programs such as a system program stored in the ROM 100. The host CPU 50 causes the display section 70 to display a navigation screen in which the output position input from the positioning calculation section 33 is plotted.

The operation section 60 is an input device that includes a touch panel, a button switch, and the like. The operation section 60 outputs a signal that indicates a key or a button that has been pressed to the host CPU 50. The user inputs various instructions such as a telephone call request or an e-mail send/receive request by operating the operation section 60.

The display section 70 is a display device that includes a liquid crystal display (LCD) or the like. The display section 70 displays various images based on a display signal input from the host CPU 50. The display section 70 displays a navigation screen, time information, and the like.

The portable telephone antenna 80 is an antenna that transmits and receives a portable telephone radio signal between the portable telephone 1 and a radio base station installed by a communication service provider of the portable telephone 1.

The portable telephone wireless communication circuit section 90 is a portable telephone communication circuit section that includes an RF conversion circuit, a baseband process circuit, and the like. The portable telephone wireless communication circuit section 70 implements a telephone call, e-mail transmission/reception, or the like by modulating/demodulating the portable telephone radio signal, for example.

The ROM 100 stores a system program that causes the host CPU 50 to control the portable telephone 1, a program and data necessary for implementing a navigation function, and the like.

The RAM 110 serves as a work area that temporarily stores the system program executed by the host CPU 50, various processing programs, data processed during various processes, processing results, and the like.

3. Process Flow

Figure 9:
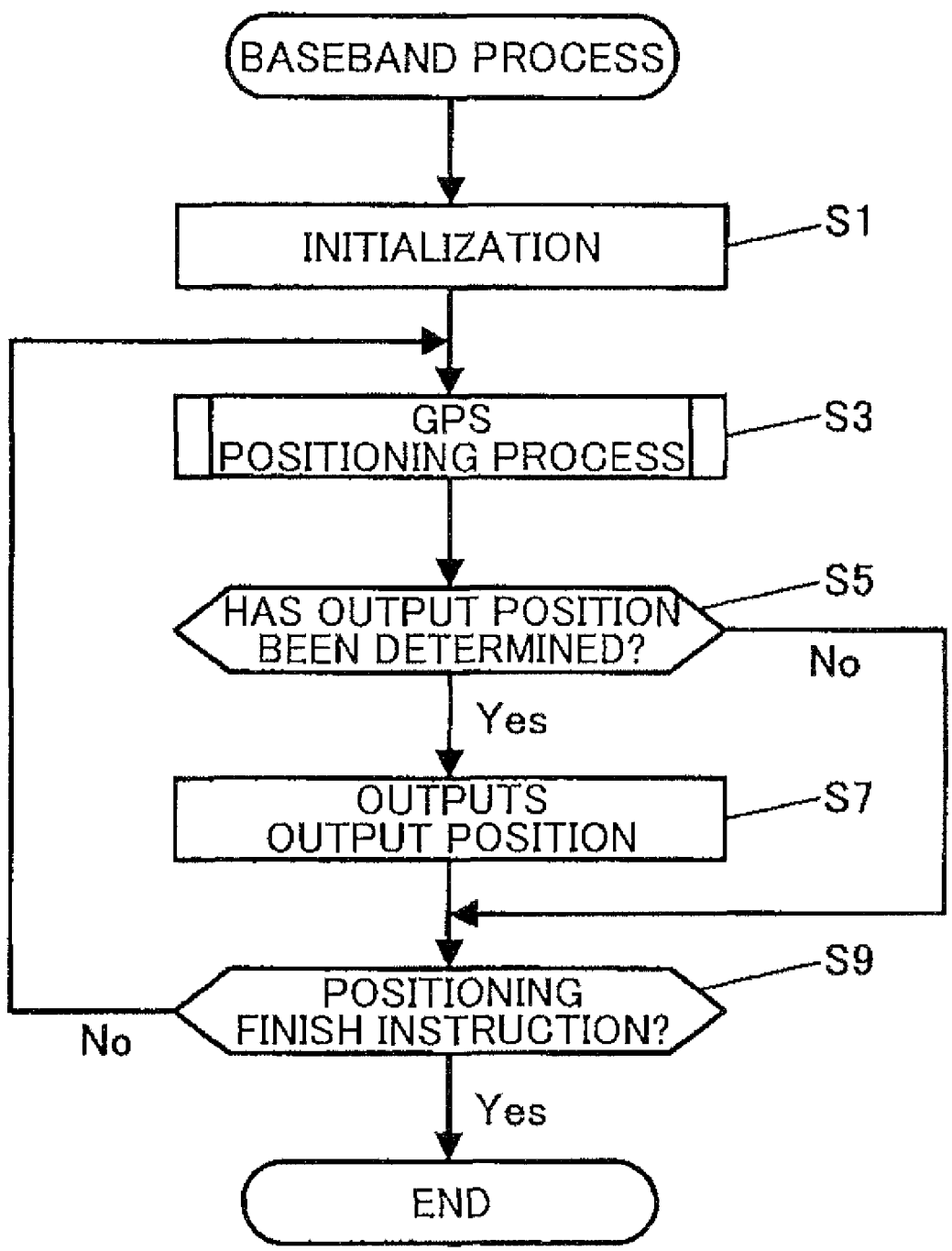
FIG. 9 is a flowchart showing the flow of a baseband process.

FIG. 9 is a flowchart showing the flow of the baseband process executed by the portable telephone 1 by causing the positioning calculation section 33 to read and execute the baseband process program 351 stored in the ROM 35. The positioning calculation section 33 starts the baseband process when the RF receiver circuit section 21 has received the GPS satellite signal and the positioning calculation section 33 has detected that the user has performed a positioning start instruction operation using the operation section 60. The baseband process is performed in parallel with various processes such as executing various application programs.

An operation that causes the portable telephone 1 to be turned ON/OFF may be associated with GPS startup/suspension, and the baseband process may be performed when an operation that causes the portable telephone 1 to be turned ON has been detected. In principle, positioning calculations are performed every second. The positioning calculation section 33 executes the baseband process while the GPS antenna 10 receives the RF signal, the RF receiver circuit section 21 down-converts the RF signal into the IF signal, and the measurement acquisition calculation section 32 acquires and calculates the measurement measured value, for example.

The positioning calculation section 33 performs an initialization process (step S1). Specifically, the positioning calculation section 33 initializes the KF parameter, and stores the KF parameter in the RAM 37 as the KF parameter data 371. The positioning calculation section 33 sets the positioning mode to be the first positioning mode, and stores the first positioning mode in the RAM 37 as the positioning mode setting data 375. The positioning calculation section 33 then performs the GPS positioning process by reading and executing the GPS positioning program 3511 stored in the ROM 35 (step S3).

Figure 10:
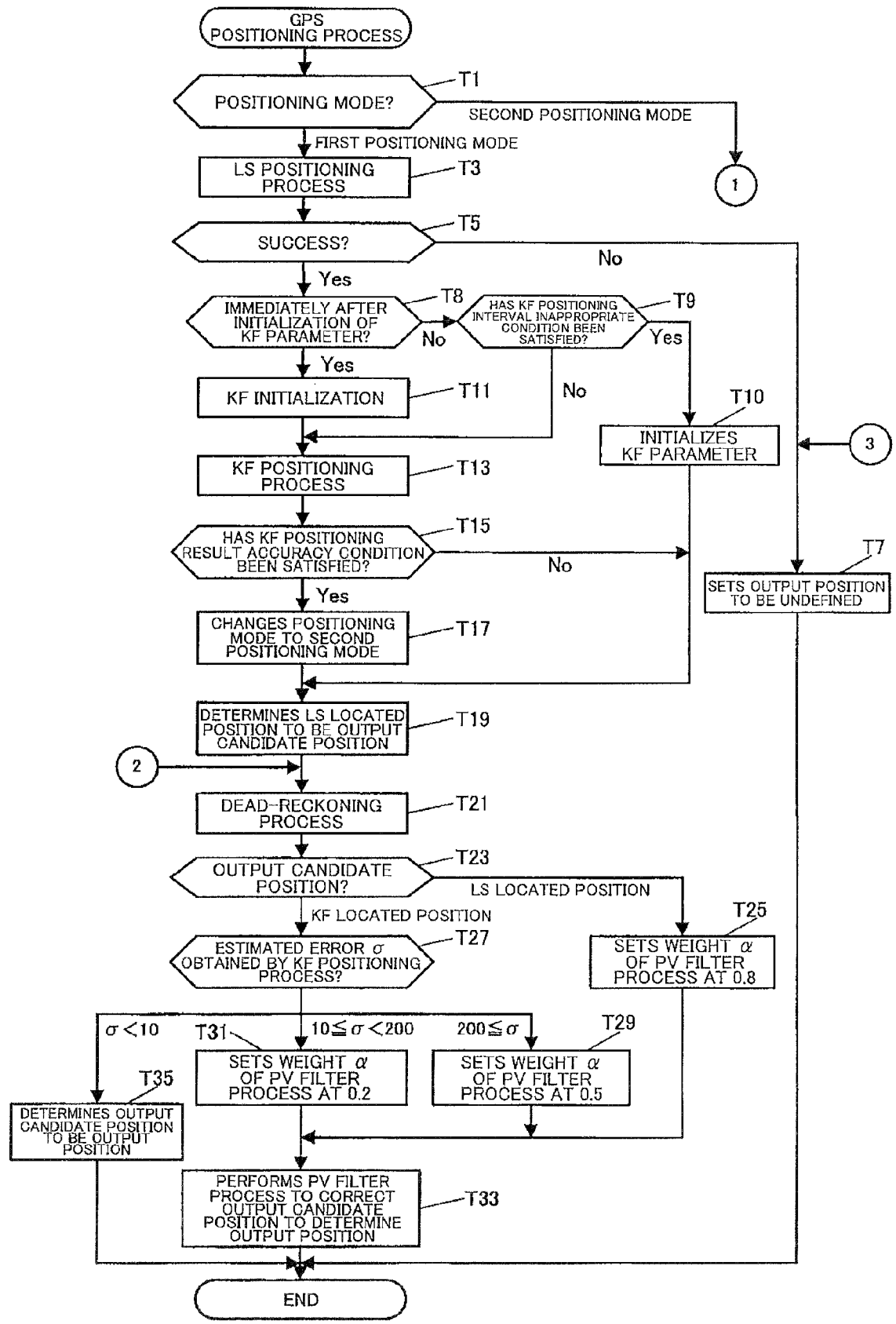
FIG. 10 is a flowchart showing the flow of a GPS positioning process.
Figure 11:
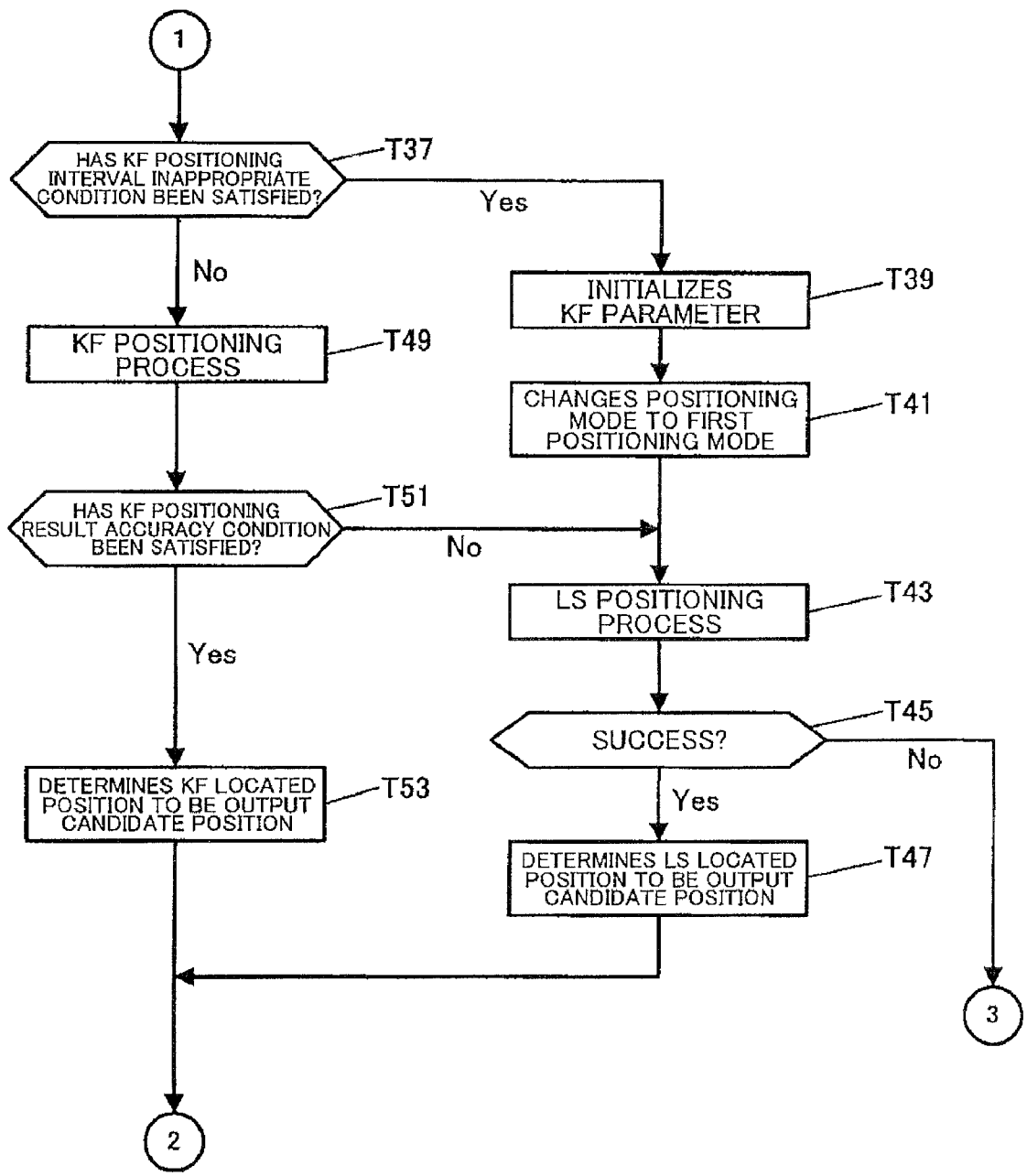
FIG. 11 is a flowchart showing the flow of a GPS positioning process.

FIGS. 10 and 11 are flowcharts showing the flow of the GPS positioning process.

The positioning calculation section 33 refers to the positioning mode setting data 375 stored in the RAM 37, and determines the positioning mode that is currently set (step T1). When the positioning calculation section 33 has determined that the positioning mode is the first positioning mode (step T1; first positioning mode), the positioning calculation section 33 performs the LS positioning process by reading and executing the LS positioning program 3513 stored in the ROM 35 (step T3).

Specifically, the positioning calculation section 33 refers to the acquired satellite measurement data 373 stored in the RAM 37, and performs positioning calculations using the least-square method based on the measurement measured values 3733 of the code phases of a plurality of acquired satellites to calculate the LS located position 3775. The positioning calculation section 33 also calculates the velocity vector 3774 based on the measurement measured value 3733 of the reception frequency. The positioning calculation section 33 stores the LS located position 3775 and the velocity vector 3774 thus calculated in the RAM 37 as the measurement history data 377.

The positioning calculation section 33 then determines whether or not the position of the portable telephone 1 has been located successfully (step T5). When the positioning calculation section 33 has determined that the position of the portable telephone 1 has not been located successfully (step T5: No), the positioning calculation section 33 sets an undefined output position (step T7), and finishes the GPS positioning process. For example, the positioning calculation section 33 determines that the position of the portable telephone 1 has not been located successfully when the number of acquired satellites (i.e., the number of measurement measured values) has not reached the number of positioning-enable satellites. The number of positioning-enable satellites is four in a three-dimensional positioning process that calculates the latitude, the longitude, and the height of the current position, and is three in a two-dimensional positioning process that calculates the latitude and the longitude of the current position, for example.

When the positioning calculation section 33 has determined that the position of the portable telephone 1 has been located successfully (step T5: Yes), the positioning calculation section 33 determines whether or not the KF parameter has been initialized immediately before the current time (step T8). When the positioning calculation section 33 has determined that the KF parameter has not been initialized immediately before the current time (step T8: No), the positioning calculation section 33 determines whether or not a KF positioning interval inappropriate condition has been satisfied (step T9). Specifically, the positioning calculation section 33 refers to the measurement history data 377 and the preceding KF positioning time data 379 stored in the RAM 37, and determines that the KF positioning interval inappropriate condition has been satisfied when (a) 60 seconds or more has elapsed from the preceding KF positioning time, or (b) 5 seconds or more has elapsed from the preceding KF positioning time and the moving distance from the preceding KF located position is 50 m or more.

Whether or not the above-mentioned conditions (a) and (b) have been satisfied cannot be determined in the first positioning process since the KF positioning process has not been performed, so that the preceding KF positioning time and the preceding KF located position are absent. Therefore, whether or not the KF positioning interval inappropriate condition has been satisfied is determined only when the preceding KF positioning information is present (i.e., when the KF parameter has not been initialized immediately before the current time) (step T8: No).

When the positioning calculation section 33 has determined that the KF positioning interval inappropriate condition has been satisfied (step T9: Yes), the positioning calculation section 33 initializes the KF parameter stored in the RAM 37 as the KF parameter data 371 (step T10), and proceeds to a step T19. When the positioning calculation section 33 has determined that the KF positioning interval inappropriate condition has not been satisfied (step T9: No), the positioning calculation section 33 proceeds to a step T13.

When the positioning calculation section 33 has determined that the KF parameter has been initialized immediately before the current time (step T8: Yes), the positioning calculation section 33 performs a KF initialization process (step T11). Specifically, the positioning calculation section 33 respectively sets the LS located position 3775 and the velocity vector 3774 calculated by the LS positioning process in the step T3 to be the position component and the velocity component of the state vector X (i.e., base values). The positioning calculation section 33 sets the remaining components of the state vector X at given values, and sets each component of the error covariance matrix P at a given value. The positioning calculation section 33 stores these values in the RAM 37 as the KF parameter data 371.

The positioning calculation section 33 then performs the KF positioning process by reading and executing the KF positioning program 3515 stored in the ROM 35 (step T3). The positioning calculation section 33 stores the KF located position 3776 and the velocity vector 3774 thus calculated in the RAM 37 as the measurement history data 377, and stores the current time as the preceding KF positioning time data 379.

The positioning calculation section 33 then determines whether or not a KF positioning result accuracy condition has been satisfied (step T15). Specifically, the positioning calculation section 33 refers to the acquired satellite measurement data 373 and the measurement history data 377 stored in the RAM 37, and determines that the KF positioning result accuracy condition has been satisfied when (1) the number of the measurement measured values 3733 is four or more, (2) the difference between the estimated error 3773 at the current time and the estimated error 3773 at a time one time before the current time is 10 or less, and (3) the positioning process has been performed in the first positioning mode two or more times.

When the positioning calculation section 33 has determined that the KF positioning result accuracy condition has not been satisfied (step T15: No), the positioning calculation section 33 proceeds to the step T19. When the positioning calculation section 33 has determined that the KF positioning result accuracy condition has been satisfied (step T15: Yes), the positioning calculation section 33 changes the positioning mode to the second positioning mode (step T17), and updates the positioning mode setting data 375 stored in the RAM 37.

The positioning calculation section 33 then determines the LS located position 3775 at the current time stored in the RAM 37 as the measurement history data 377 to be the output candidate position 3778 (step T19), and stores the LS located position 3775 as the measurement history data 377. The positioning calculation section 33 then performs a dead-reckoning process (step T21). Specifically, the positioning calculation section 33 calculates the dead-reckoning position 3777 by adding the velocity vector 3774 at the current time to the output position 3779 at a time one time before the current time stored as the measurement history data 377, and stores the dead-reckoning position 3777 as the measurement history data 377.

The positioning calculation section 33 then determines the output candidate position 3778 at the current time stored in the RAM 37 as the measurement history data 377. When the positioning calculation section 33 has determined that the output candidate position 3778 is the LS located position 3775 (step T23: LS located position), the positioning calculation section 33 sets a weight α of the PV filter process at 0.8 (step T25). When the positioning calculation section 33 has determined that the output candidate position 3778 is the KF located position 3776 (step T23: KF located position), the positioning calculation section 33 determines the estimated error σ calculated based on the KF positioning process result (step T27).

When the estimated error σ is 200 or more (step T27: 200≦σ), the positioning calculation section 33 sets the weight α of the PV filter process at 0.5 (step T29). When the estimated error σ is 10 or more and less than 200 (step T27: 10≦σ<200), the positioning calculation section 33 sets the weight α of the PV filter process at 0.2 (step T31).

After setting the weight a in the step T25, T29, or T31, the positioning calculation section 33 performs the PV filter process to correct the output candidate position 3778 to determine the output position 3779 (step T33). Specifically, the positioning calculation section 33 calculates the output position 3779 according to the following expression (10) using the output candidate position 3778 and the dead-reckoning position 3777 at the current time stored in the RAM 37 as the measurement history data 377 and the weight α that has been set.

$$p = (1-\alpha)p_C + \alpha p_E \tag{10}$$

where, p indicates the output position, $p_C$ indicates the output candidate position, and $P_E$ indicates the dead-reckoning position.

According to the expression (10), the dead-reckoning position is regarded as more important as the weight α increases, and the output candidate position is regarded as more important as the weight α decreases. Therefore, the dead-reckoning position is regarded as important as compared with the output candidate position when the output candidate position is the LS located position, and the output candidate position is regarded as important as compared with the dead-reckoning position when the output candidate position is the KF located position and the estimated error σ of the KF located position is relatively small. The positioning calculation section 33 stores the determined output position 3779 as the measurement history data 377, and then finishes the GPS positioning process.

When the positioning calculation section 33 has determined that the estimated error σ is less than 10 in the step T27 (step T27: σ<10), the positioning calculation section 33 determines the output candidate position 3778 at the current time stored as the measurement history data 377 to be the output position 3779 (step T35), and stores the output candidate position 3778 as the measurement history data 377. The positioning calculation section 33 then finishes the GPS positioning process.

When the output candidate position is the KF located position and the estimated error σ of the KF located position is relatively small, the output candidate position is determined to be the output position without performing the PV filter process (i.e., the output candidate position is determined to be reliable).

When the positioning calculation section 33 has determined that the positioning mode is the second positioning mode in the step T1 (step T1: second positioning mode), the positioning calculation section 33 determines whether or not the KF positioning interval inappropriate condition has been satisfied (step T37). The positioning calculation section 33 determines whether or not the KF positioning interval inappropriate condition has been satisfied in the same manner as in the step T9.

When the positioning calculation section 33 has determined that the KF positioning interval inappropriate condition has been satisfied (step T37: Yes), the positioning calculation section 33 initializes the KF parameter stored in the RAM 37 as the KF parameter data 371 (step T39). The positioning calculation section 33 then changes the positioning mode stored in the RAM 37 as the positioning mode setting data 375 to the first positioning mode (step T41).

The positioning calculation section 33 then performs the LS positioning process by reading and executing the LS positioning program 3513 stored in the ROM 35 (step T43). The positioning calculation section 33 stores the LS located position 3775 and the velocity vector 3774 thus calculated in the RAM 37 as the measurement history data 377.

The positioning calculation section 33 then determines whether or not the position of the portable telephone 1 has been located successfully (step T45). When the positioning calculation section 33 has determined that the position of the portable telephone 1 has not been located successfully (step T45: No), the positioning calculation section 33 proceeds to the step T7. When the positioning calculation section 33 has determined that the position of the portable telephone 1 has been located successfully (step T45: Yes), the positioning calculation section 33 determines the LS located position 3775 calculated by the LS positioning process in the step T43 to be the output candidate position 3778 (step T47), stores the LS located position 3775 in the RAM 37 as the measurement history data 377, and proceeds to a step T21.

When the positioning calculation section 33 has determined that the KF positioning interval inappropriate condition has not been satisfied (step T37: No), the positioning calculation section 33 then performs the KF positioning process by reading and executing the KF positioning program 3515 stored in the ROM 35 (step T49). The positioning calculation section 33 stores the KF located position 3776 and the velocity vector 3774 thus calculated in the RAM 37 as the measurement history data 377, and stores the current time as the preceding KF positioning time data 379.

In the KF positioning process in the step T49, the positioning calculation section 33 performs positioning calculations using the preceding KF located position and the velocity vector at the preceding KF positioning time stored in the RAM 37 as the measurement history data 377 as the base values of the position component and the velocity component of the state vector X. Note that the positioning calculation section 33 may perform positioning calculations using the output position at a time one time before the current time as the base value instead of the preceding KF located position, or perform positioning calculations using the velocity vector at a time one time before the current time as the base value instead of the velocity vector at the preceding KF positioning time.

The positioning calculation section 33 then determines whether or not the KF positioning result accuracy condition has been satisfied (step T51). The positioning calculation section 33 determines whether or not the KF positioning result accuracy condition has been satisfied in the same manner as in the step T15. When the positioning calculation section 33 has determined that the KF positioning result accuracy condition has not been satisfied (step T51: No), the positioning calculation section 33 proceeds to the step T43.

When the positioning calculation section 33 has determined that the KF positioning result accuracy condition has been satisfied (step T51: Yes), the positioning calculation section 33 determines the KF located position 3776 calculated by the KF positioning process in the step T49 to be the output candidate position 3778 (step T53), stores the KF located position 3776 in the RAM 37 as the measurement history data 377, and proceeds to the step T21.

Again referring to the baseband process shown in FIG. 9, the positioning calculation section 33 determines whether or not the output position 3779 has been determined after completion of the GPS positioning process (step S5). When the positioning calculation section 33 has determined that the output position 3779 is undefined (step S5: No), the positioning calculation section 33 proceeds to the step S9. When the positioning calculation section 33 has determined that the output position 3779 has been determined (step S5: Yes), the positioning calculation section 33 outputs the output position 3779 at the current time stored in the RAM 37 as the measurement history data 377 to the host CPU 50 (step S7).

The positioning calculation section 33 then determines whether or not the user has issued a positioning finish instruction using the operation section 60 (step S9). When the positioning calculation section 33 has determined that the user has not issued the positioning finish instruction (step S9: No), the positioning calculation section 33 returns to the step S3. When the positioning calculation section 33 has determined that the user has issued the positioning finish instruction (step S9: Yes), the positioning calculation section 33 finishes the baseband process.

4. Experimental Results

Figure 12:
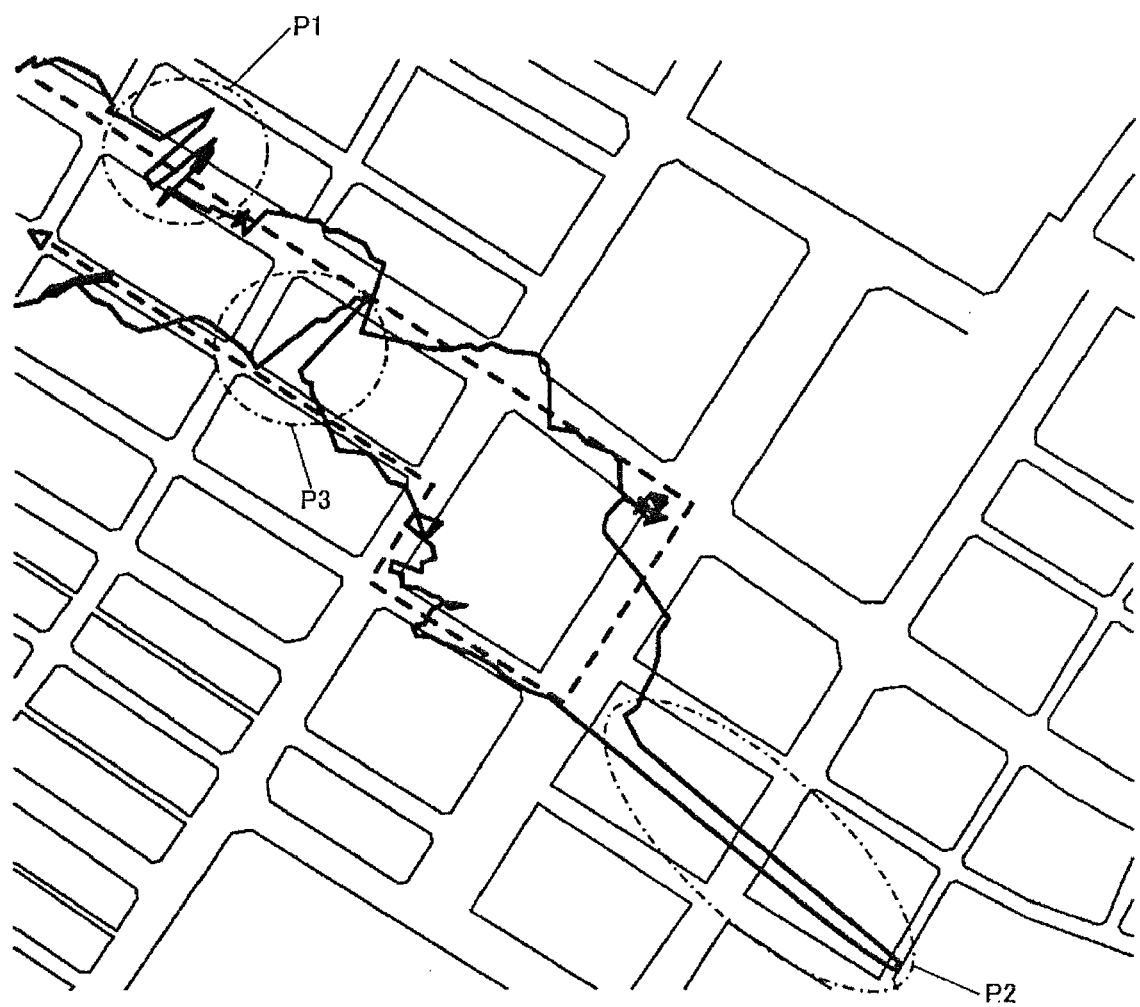
FIG. 12 is a view showing an example of experimental results when performing only an LS positioning process.

FIG. 12 is a view showing an example of experimental results when performing only the LS positioning process. FIG. 12 shows the path of the output position at each time when the user carrying the portable telephone 1 drove along a path indicated by a dotted arrow. As shown in FIG. 12, a position jump occurred in areas P1 to P3 indicated by dash-dotted lines. In particular, a position jump to a position significantly away from the true path occurred in the area P2.

Figure 13:
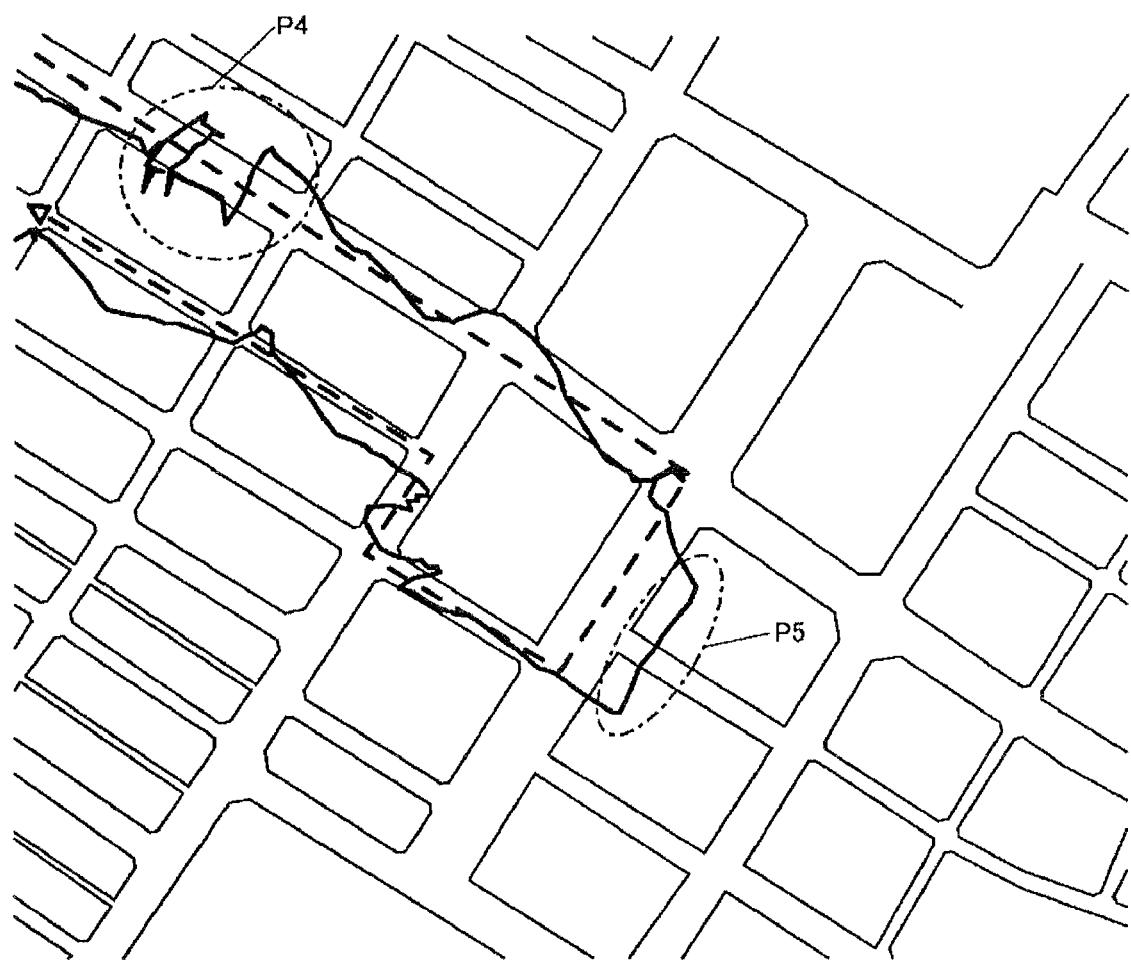
FIG. 13 is a view showing an example of experimental results when performing only a KF positioning process.

FIG. 13 is a view showing an example of experimental results when performing only the KF positioning process. As shown in FIG. 13, the output position deviated from the true position in areas P4 and P5 indicated by dash-dotted lines. When using the KF positioning process, when the output position has deviated from the true position, the output position tends to continuously deviate from the true position until a reliable measurement measured value is obtained.

Figure 14:
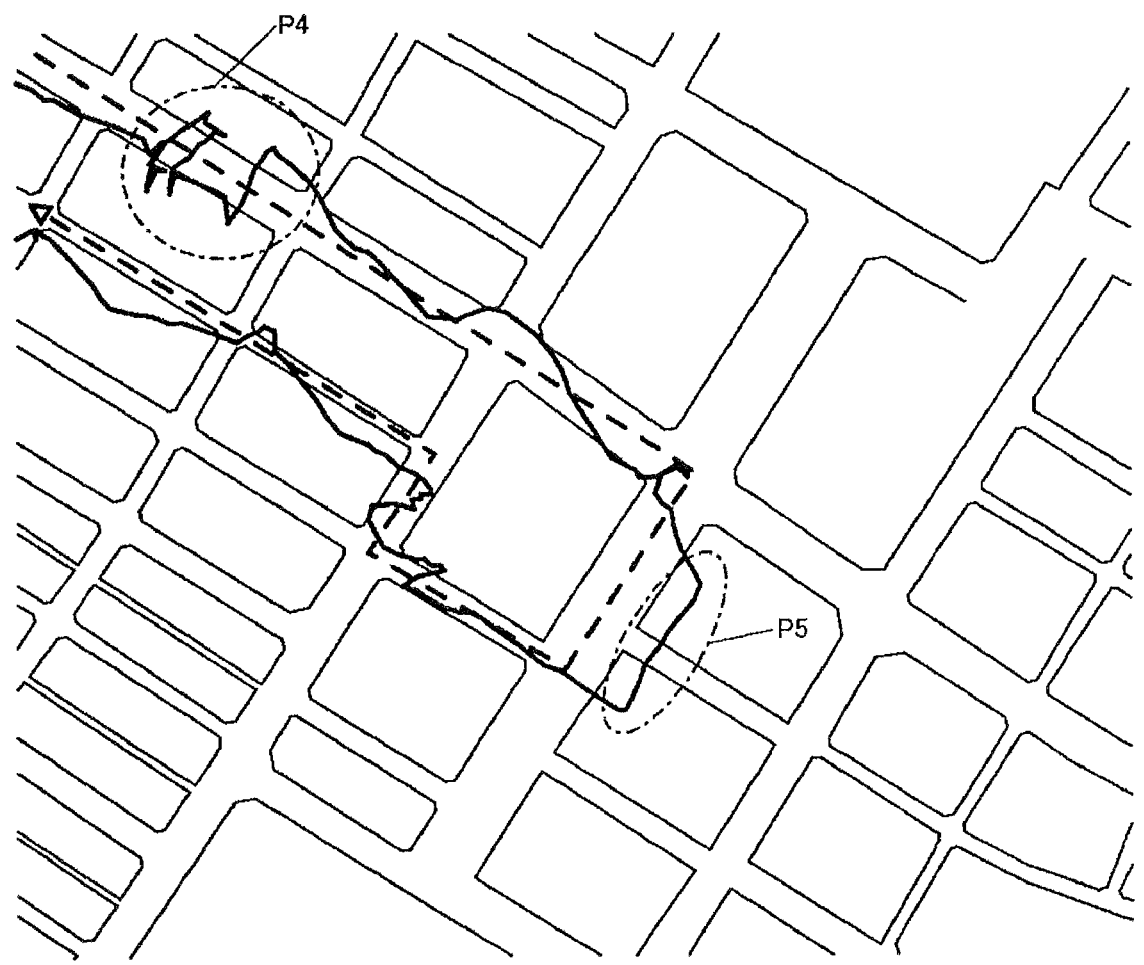
FIG. 14 is a view showing an example of experimental results when performing a process according to one embodiment of the invention.

FIG. 14 is a view showing an example of experimental results when performing the process according to this embodiment. A position jump was suppressed as compared with the results shown in FIG. 12. A deviation of the output position from the true position was reduced as compared with the results shown in FIG. 13. Therefore, it was confirmed that the accuracy of the positioning results was significantly improved.

5. Effects

According to this embodiment, the first positioning mode is a mode in which the LS positioning process is performed, and the KF positioning process is performed using the positioning result as the base value. The second positioning mode is a mode in which the KF positioning process is further performed using the positioning result obtained by the preceding KF positioning process as the base value. The KF positioning process is performed in the first positioning mode and the second positioning mode. The second positioning mode is a mode in which the KF positioning process is successively performed irrespective of whether the positioning mode at a time one time before the current time (preceding positioning mode) is the first positioning mode or the second positioning mode.

The positioning mode at the next time (subsequent positioning mode) is changed to the first positioning mode or the second positioning mode corresponding to the accuracy of the positioning result obtained by the KF positioning process performed in the first positioning mode or the second positioning mode at the current time. The KF positioning process is successively performed when the positioning mode has been changed to the second positioning mode. When the positioning mode has been changed to the first positioning mode, the LS positioning process is performed after the KF positioning process has been suspended, and the KF positioning process is performed using the positioning result as the base value.

This makes it possible to appropriately determine whether to continue the KF positioning process or perform the LS positioning process corresponding to the accuracy of the positioning result obtained by the KF positioning process. As a result, the accuracy of the positioning result can be improved.

6. Modification

6-1. Electronic Instrument

The invention may be applied to an arbitrary electronic instrument that includes a positioning device. For example, the invention may be similarly applied to a notebook personal computer, a personal digital assistant (PDA), a car navigation system, and the like.

6-2. Satellite Positioning System

The above embodiments have been described taking the GPS as an example of the satellite positioning system. Note that the invention may also be applied to other satellite positioning systems such as the wide area augmentation system (WAAS), the quasi zenith satellite system (QZSS), the global navigation satellite system (GLONASS), and the GALILEO.

6-3. Process Splitting

The host CPU 50 may execute some or all of the processes executed by the positioning calculation section 33. For example, the host CPU 50 may determine or change the positioning mode, and the positioning calculation section 33 may perform the LS positioning process and the KF positioning process. The host CPU 50 may execute all of the processes executed by the positioning calculation section 33 including the LS positioning process and the KF positioning process.

6-4. Determination of Output Candidate Position in First Positioning Mode

Figure 15:
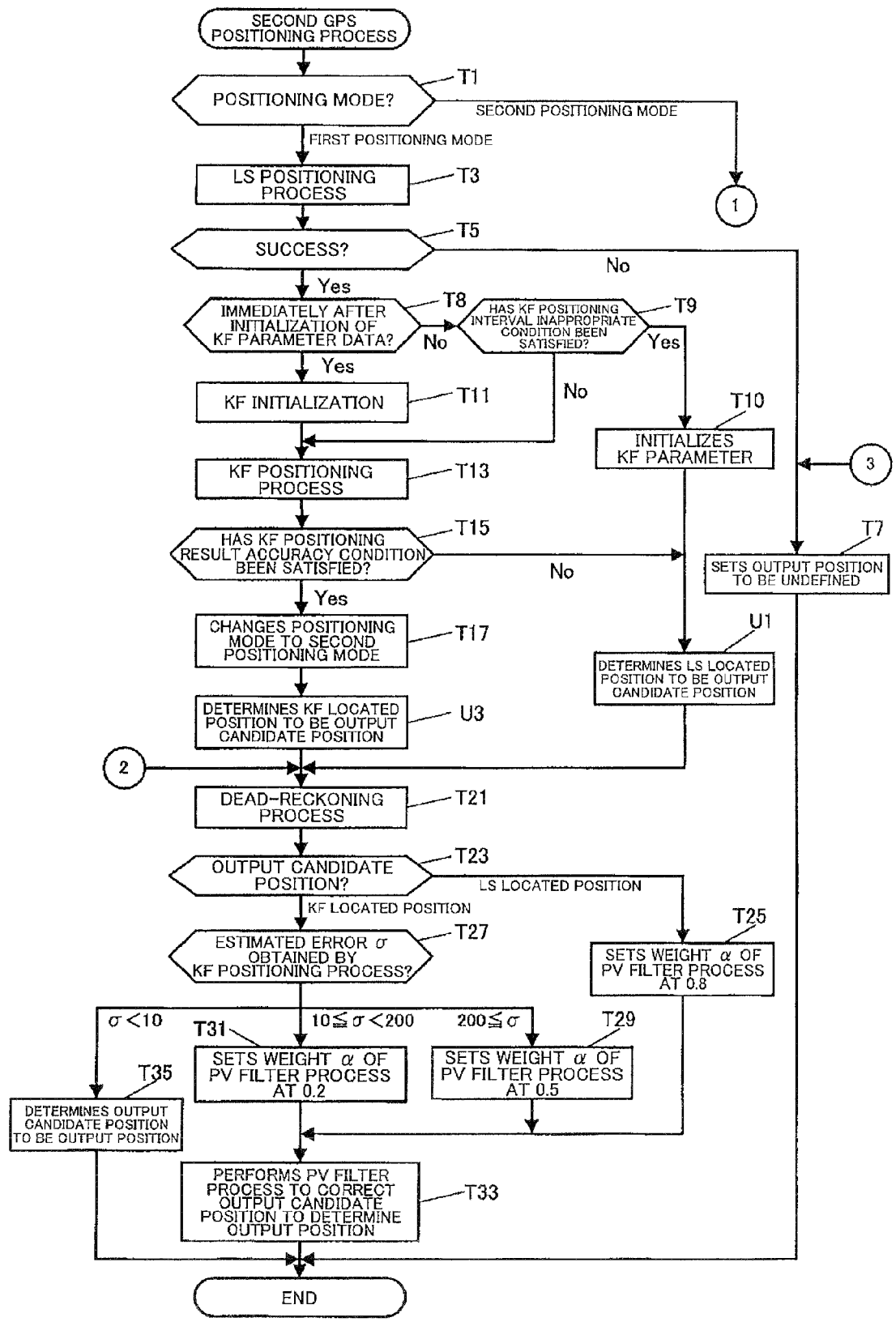
FIG. 15 is a flowchart showing the flow of a second GPS positioning process.

The above embodiments have been described taking an example in which the LS located position is necessarily determined to be the output candidate position in the first positioning mode. Note that the KF located position may be determined to be the output candidate position when the positioning result obtained by the KF positioning process is accurate. FIG. 15 is a flowchart showing the flow of a second GPS positioning process performed by the positioning calculation section 33 in this case. The same steps as the steps of the GPS positioning process shown in FIG. 10 are indicated by the same symbols. The following description mainly focuses on the difference from the GPS positioning process shown in FIG. 10.

In the second GPS positioning process, when the positioning calculation section 33 has initialized the KF parameter in the step T10 or determined that the KF positioning result accuracy condition has not been satisfied in the step T15 (step T15: No), the positioning calculation section 33 determines the LS located position to be the output candidate position (step U1). The positioning calculation section 33 then proceeds to the dead-reckoning process in the step T21.

When the positioning calculation section 33 has determined that the KF positioning result accuracy condition has been satisfied in the step T15 (step T15: Yes), the positioning calculation section 33 changes the positioning mode to the second positioning mode (step T17), and determines the KF located position to be the output candidate position (step U3). The positioning calculation section 33 then proceeds to the dead-reckoning process in the step T21.

6-5. LS Positioning Process in Second Positioning Mode

The above embodiments have been described taking an example in which the LS positioning process is performed in the second positioning mode when the accuracy of the positioning result obtained by the KF positioning process is poor, and the calculated LS located position is determined to be the output candidate position. However, when the accuracy of the positioning result obtained by the KF positioning process is poor, a measurement measured value with low reliability may be included in the measurement measured values used for the KF positioning process.

Figure 16:
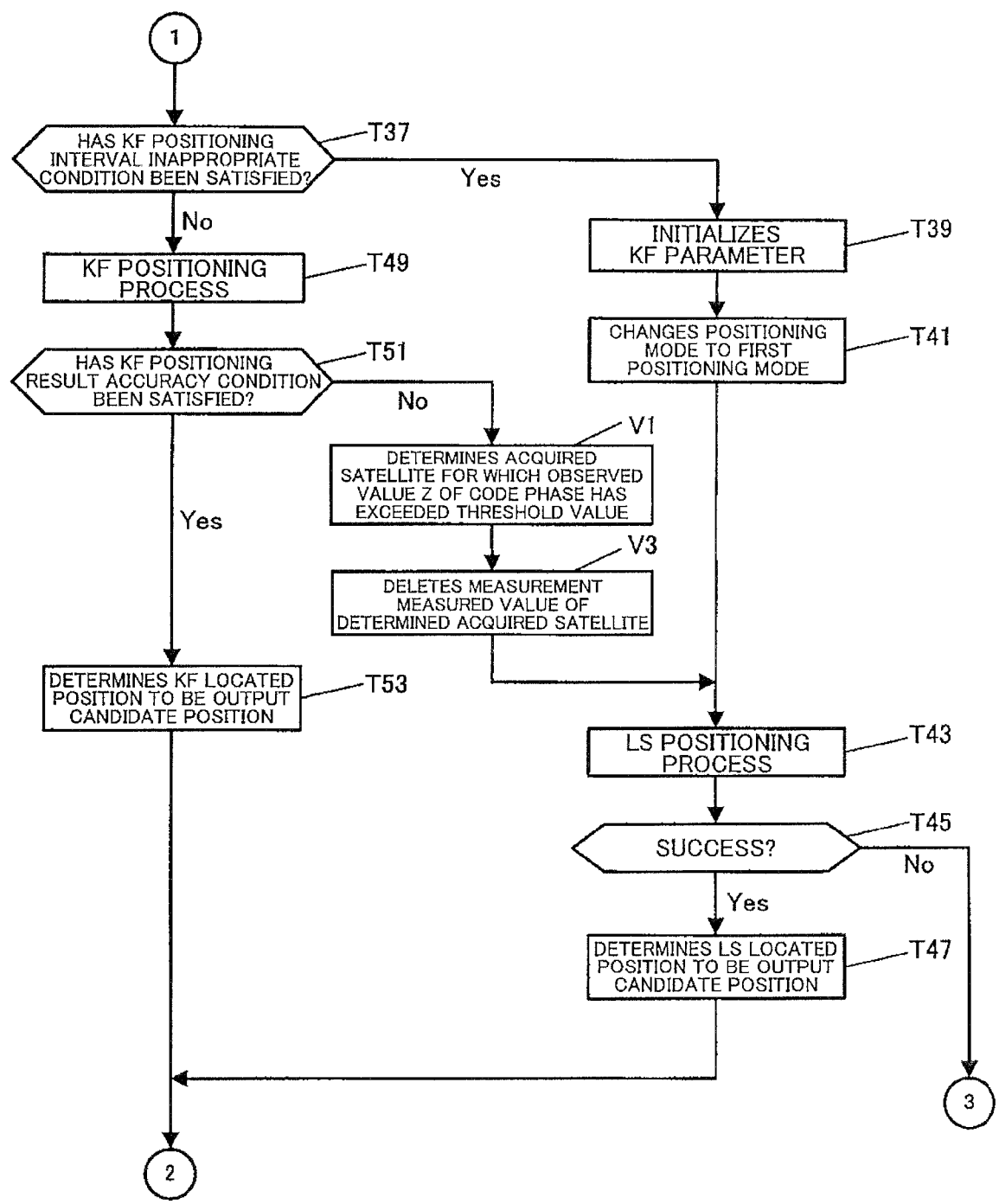
FIG. 16 is a flowchart showing the flow of a third GPS positioning process.

Therefore, when the accuracy of the positioning result obtained by the KF positioning process is poor, the LS positioning process may be performed while excluding a measurement measured value with low reliability (i.e., GPS satellite signal with low reliability). FIG. 16 shows part (corresponding to FIG. 11) of a third GPS positioning process performed by the positioning calculation section 33 in this case. The same steps as the steps of the GPS positioning process shown in FIG. 11 are indicated by the same symbols. The following description mainly focuses on the difference from the GPS positioning process shown in FIG. 11.

In the third GPS positioning process, when the positioning calculation section 33 has determined that the KF positioning result accuracy condition has not been satisfied in the step T51 (step T51: No), the positioning calculation section 33 determines the acquired satellite 3731 for which the observed value Z of the code phase has exceeded a given threshold value (step V1). The positioning calculation section 33 deletes the measurement measured value 3733 of the determined acquired satellite 3731 from the measurement measured values 3733 stored in the RAM 37 as the acquired satellite measurement data 373 (step V3). The positioning calculation section 33 then performs the LS positioning process using the remaining measurement measured values 3733 (step T43).

Since the observed value Z is the difference between the measurement measured value and the measurement predicted value, the measurement measured value differs to a larger extent from the measurement predicted value as the observed value Z increases (i.e., the measurement measured value may have low reliability). Therefore, the accuracy of the positioning result obtained by the LS positioning process can be improved by excluding the measurement measured value of the acquired satellite for which the observed value Z has exceeded a given threshold value, and performing the LS positioning process using the remaining measurement measured values. As a result, a more reliable output position can be obtained.

6-6. Dead-Reckoning Process

The above embodiments have been described taking an example in which the dead-reckoning position is calculated in the dead-reckoning process by adding the velocity vector at the current time to the output position at a time one time before the current time. Note that the dead-reckoning position may be calculated by adding the velocity vector at a time one time before the current time to the output position at a time one time before the current time. The dead-reckoning position may be calculated by adding a velocity vector obtained by averaging the velocity vector at a time one time before the current time and the velocity vector at the current time to the output position at a time one time before the current time.

In the KF positioning process, the predicted position is calculated by performing the position prediction process (step A5 in FIG. 1). Therefore, when the KF positioning process has been performed, the output position may be determined by performing the PV filter process using the predicted position calculated by the position prediction process and the output candidate position without performing the dead-reckoning process.

6-7. Filter Process

The above embodiments have been described taking the PV filter process as an example of the filter process. Note that another filter process may be appropriately selected. For example, the output position may be determined by performing a binary smoothing filter process that subjects the output candidate position at the current time and the output position at a time one time before the current time to a binary smoothing process, or may be determined by performing a multi-valued regression estimation filter process that performs multi-valued regression estimation using the output candidate position at the current time and the preceding output positions corresponding to a given period (e.g., 10 seconds).

6-8. KF Positioning Interval Inappropriate Condition

The above embodiments have been described taking an example in which the positioning calculation section 33 determines that the KF positioning interval inappropriate condition has been satisfied when (a) 60 seconds or more has elapsed from the preceding KF positioning time, or (b) 5 seconds or more has elapsed from the preceding KF positioning time and the moving distance from the preceding KF located position is 50 m or more. Note that the positioning calculation section 33 may determine that the KF positioning interval inappropriate condition has been satisfied when the conditions (a) and (b) have been satisfied. Specifically, the positioning calculation section 33 determines that the KF positioning interval inappropriate condition has been satisfied when 60 seconds or more has elapsed from the preceding KF positioning time and the moving distance from the preceding KF located position is 50 m or more. Note that the values "60 seconds", "5 seconds", and "50 m" are examples. The values may be appropriately set.

6-9. KF Positioning Result Accuracy Condition

The above embodiments have been described taking an example in which the positioning calculation section 33 determines that the KF positioning result accuracy condition has been satisfied when (1) the number of the measurement measured values is four or more, (2) the difference between the estimated error at the current time and the estimated error at a time one time before the current time is 10 or less, and (3) the positioning process has been performed in the first positioning mode two or more times. Note that the positioning calculation section 33 may determine that the KF positioning result accuracy condition has been satisfied when one of the conditions (1) to (3) has been satisfied.

The KF positioning result accuracy condition may be determined based on other conditions. For example, the positioning calculation section 33 may determine whether or not the KF positioning result accuracy condition has been satisfied by determining (4) whether or not the GPS satellite signal reception environment is a strong field environment in which a strong signal can be received, (5) whether or not the average signal strength of the GPS satellite signals received from the acquired satellites is equal to or higher than a given value, or (6) the position dilution of precision (PDOP) (i.e., an index of the constellation of the acquired satellites) is less than a given value.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning method comprising:
    executing a first positioning mode or a second positioning mode, an LS positioning process that is performed using a least-square method based on a positioning signal and a KF positioning process that is performed using a Kalman filter based on the positioning signal utilizing a positioning result obtained by the LS positioning process as a base value being performed in the first positioning mode, and the KF positioning process being further performed in the second positioning mode utilizing a positioning result obtained by the KF positioning process as a base value;
    determining a located position calculated by a currently executed positioning mode to be a candidate position;

determining accuracy of a positioning result obtained by the KF positioning process performed in the currently executed positioning mode;

changing the positioning mode to be executed to the first positioning mode or the second positioning mode corresponding to the accuracy;

calculating a dead-reckoning position by performing a dead-reckoning process using a velocity vector obtained by the currently executed positioning mode; and determining an output position by calculating a weighted average of the candidate position and the dead-reckoning position based on an estimated error of the KF positioning process performed in the currently executed positioning mode.

2. The positioning method as defined in claim 1, wherein the changing of the positioning mode including changing the positioning mode to the second positioning mode when the executed positioning mode is the first positioning mode and the accuracy satisfies a given accuracy condition.

3. The positioning method as defined in claim 1, further comprising determining whether or not an elapsed time from the preceding KF positioning process satisfies a given overtime condition, and changing the positioning mode to the first positioning mode when the executed positioning mode is the second positioning mode and the elapsed time has been determined to satisfy the overtime condition.

4. The positioning method as defined in claim 1, wherein the determining of the candidate position includes determining a located position calculated by the KF positioning process in the first positioning mode to be the candidate position when the currently executed positioning mode is the first positioning mode and the accuracy satisfies a given accuracy condition, and determining a located position calculated by the LS positioning process in the first positioning mode to be the candidate position when the currently executed positioning mode is the first positioning mode and the accuracy does not satisfy the given accuracy condition; and the determining of the output position includes changing a weight of the weighted average based on whether the candidate position is a positioning result obtained by the LS positioning process or a positioning result obtained by the KF positioning process.

5. The positioning method as defined in claim 1, wherein the determining of the candidate position includes determining a located position calculated by the KF positioning process in the second positioning mode to be the candidate position when the currently executed positioning mode is the second positioning mode and the accuracy satisfies a given accuracy condition, and determining a located position calculated by the LS positioning process to be the candidate position when the currently executed positioning mode is the second positioning mode and the accuracy does not satisfy the given accuracy condition, and the determining of the output position includes changing a weight of the weighted average based on whether the candidate position is a positioning result obtained by the LS positioning process or a positioning result obtained by the LF positioning process.

6. The positioning method as defined in claim 1, wherein the determining of the candidate position includes determining a located position calculated by the KF positioning process in the second positioning mode to be the candidate position when the currently executed positioning mode is the second positioning mode and the accuracy satisfies a given accuracy condition, determining a located position calculated by executing the LS positioning process using positioning signals, which have been used for the KF positioning process in the second positioning mode and from which a positioning signal that satisfies a given low accuracy factor condition is excluded, to be the candidate position, when the currently executed positioning mode is the second positioning mode and the accuracy does not satisfy the given accuracy condition, and the determining of the output position includes changing a weight of the weighted average based on whether the candidate position is a position result obtained by the LF positioning process or a positioning result obtained by the KF positioning process.

7. A positioning device comprising:

a positioning section that executes a first positioning mode or a second positioning mode, an LS positioning process that is performed using a least-square method based on a positioning signal and a KF positioning process that is performed using a Kalman filter based on the positioning signal utilizing a positioning result obtained by the KF positioning process as a base value being performed in the first positioning mode, and the KF positioning process being further performed in the second positioning mode utilizing a positioning result obtained by the second positioning process as a base value;

a candidate position determination section that determines a located position calculated by a currently executed positioning mode to be a candidate position;

a determination section that determines accuracy of a positioning result obtained by the KF positioning process performed in the positioning mode executed by the positioning section;

a mode change section that changes the positioning mode to be executed to the first positioning mode or the second positioning mode corresponding to the accuracy obtained by the determination section;

a dead-reckoning positioning section that calculates a dead-reckoning position by performing a dead-reckoning process using a velocity vector obtained by the positioning mode executed by the positioning section; and an output position determination section that determines an output position by calculating a weighted average of the candidate position and the dead-reckoning position based on an estimated error of the KF positioning process performed in the positioning mode executed by the positioning section.

8. The positioning device as defined in claim 7, wherein the mode change section changes the positioning mode to the second positioning mode when the positioning mode executed by the positioning section is the first positioning mode and the accuracy satisfies a given accuracy condition.

9. The positioning device as defined in claim 7, further comprising an overtime condition determination section that determines whether or not an elapsed time from the preceding KF positioning process satisfies a given overtime condition, wherein the mode change section changes the positioning mode to the first positioning mode when the positioning mode executed by the positioning section is the second positioning mode and the overtime condition determination section has determined that the elapsed time has satisfied the overtime condition.

10. The positioning device as defined in claim 7, wherein
the candidate position determination section determines a located position calculated by the KF positioning process in the first positioning mode to be the candidate position when the positioning mode executed by the positioning section is the first positioning mode and the accuracy satisfies a given accuracy condition, and determines a located position calculated by the LS positioning process in the first positioning mode to be the candidate position when the positioning mode executed by the positioning section is the first positioning mode and the accuracy does not satisfy the given accuracy condition, and the output section changes a weight of the weighted average based on whether the candidate position is a positioning result obtained by the LS positioning process or a positioning result obtained by the KF positioning process.

11. The positioning device as defined in claim 7, wherein
the candidate position determination section determines a located position calculated by the KF positioning process in the second positioning mode to be the candidate position when the positioning mode executed by the positioning section is the second positioning mode and the accuracy satisfies a given accuracy condition, determines a located position calculated by executing the LS positioning process to be the candidate position when the positioning mode executed by the positioning section is the second positioning mode and the accuracy does not satisfy the given accuracy condition, and determines a located position calculated by the first positioning process to be the candidate position for the current position, and the output position determination section changes a weight of the weighted average based on whether the candidate position is a positioning result obtained by the LS positioning process or a positioning result obtained by the KF positioning process.

12. The positioning device as defined in claim 7, wherein
the candidate position determination section determines a located position calculated by the second positioning process in the second positioning mode to be the candidate position when the positioning mode executed by the positioning section is the second positioning mode and the accuracy satisfies a given accuracy condition, and determines a located position calculated by executing the LS positioning process using positioning signals, which have been used for the KF positioning process in the second positioning mode and from which a positioning signal that satisfies a given low accuracy factor condition is excluded, to be the candidate position, when the positioning mode executed by the positioning section is the second positioning mode and the accuracy does not satisfy the given accuracy condition, and the output position determination section changes a weight of the weighted average based on whether the candidate position is a positioning result obtained by the LS positioning process or a positioning result obtained by the KF positioning process.

13. A program that causes a computer to:
execute a first positioning mode or a second positioning mode, an LS positioning process that is performed using a least-square method based on a positioning signal and a KF positioning process that is performed using a Kalman filter based on the positioning signal utilizing a positioning result obtained by the LS positioning process as a base value being performed in the first positioning mode, and the KF positioning process being further performed in the second positioning mode utilizing a positioning result obtained by the KF positioning process as a base value;

determine a located position calculated by a currently executed positioning mode to be a candidate position;

determine accuracy of a positioning result obtained by the KF positioning process performed in the currently executed positioning mode;

change the positioning mode to be executed to the first positioning mode or the second positioning mode corresponding to the accuracy;

calculate a dead-reckoning position by performing a dead-reckoning process using a velocity vector obtained by the currently executed positioning mode; and determine an output position by calculating a weighted average of the candidate position and the dead-reckoning position based on an estimated error of the KF positioning process performed in the currently executed positioning mode.

* * * * *